US012755072B2

(12) United States Patent
Yakuwa et al.

(10) Patent No.: US 12,755,072 B2
(45) Date of Patent: Oct. 6, 2026

(54) SYSTEM DESIGN LEARNING DEVICE, SYSTEM DESIGN LEARNING METHOD, AND RECORDING MEDIUM

(71) Applicant: NEC Corporation, Tokyo (JP)

(72) Inventors: Yutaka Yakuwa, Tokyo (JP); Takayuki Kuroda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1401 days.

(21) Appl. No.: 17/495,012

(22) Filed: Oct. 6, 2021

(65) Prior Publication Data

US 2022/0114311 A1 Apr. 14, 2022

(30) Foreign Application Priority Data

Oct. 9, 2020 (JP) ................................ 2020-171169
May 25, 2021 (JP) ................................ 2021-087757

(51) Int. Cl.
*G06F 30/27* (2020.01)
*G06F 111/20* (2020.01)

(52) U.S. Cl.
CPC .......... *G06F 30/27* (2020.01); *G06F 2111/20* (2020.01)

(58) Field of Classification Search
CPC ............................ G06F 30/27; G06F 2111/20
See application file for complete search history.

(56) References Cited

U.S. PATENT DOCUMENTS

2021/0240448 A1 8/2021 Kuorada et al.
2023/0205953 A1* 6/2023 Venugopalan ....... G06N 3/0464 703/2

FOREIGN PATENT DOCUMENTS

JP H04-137073 A 5/1992
WO 2019/216082 A1 11/2019

OTHER PUBLICATIONS

Kuroda, T., Nakanoya, M., Kitano, A., & Gokhale, A. (Apr. 2016). The configuration-oriented planning for fully declarative IT system provisioning automation. In NOMS 2016-2016 IEEE/IFIP Network Operations and Management Symposium (pp. 808-811). IEEE. (Year: 2016).*

T. Kuroda and A. Gokhale, "Model-Based IT Change Management for Large System Definitions with State-Related Dependencies," 2014 IEEE 18th International Enterprise Distributed Object Computing Conference, Ulm, Germany, 2014, pp. 170-179, doi: 10.1109/EDOC.2014.31. (Year: 2014).*

(Continued)

*Primary Examiner* — Bijan Mapar
(74) *Attorney, Agent, or Firm* — Sughrue Mion, PLLC

(57) ABSTRACT

A system design learning device includes: at least one memory configured to store instructions; and at least one processor configured to execute the instructions to: perform, with respect to a design target system whose system requirement is shown, system design in which application of a conversion rule to a component of the design target system is iterated until a design result of the system design is obtained; determine an evaluation value for the system design based on the design result; determine an evaluation value related to conversion of each component in the system design based on the evaluation value for the system design; and learn about selection of a component to which the conversion rule is applied based on learning data including the evaluation value related to the conversion of each component.

11 Claims, 16 Drawing Sheets

(56) References Cited

OTHER PUBLICATIONS

JP Office Communication for JP Application No. 2021-087757, mailed on Jan. 21, 2025 with English Translation.
Yutaka Yakuwa et al., "Efficient Reinforcement learning for Automation of ICT System Design", IEICE Technical Report NC2020-7,IBISML2020-7(Jun. 2020), [Online] The Institute of Electronics, Information and Communication Engineers, Jun. 22, 2020, vol. 120, No. 80, pp. 39-46, [date of search Aug. 3, 2020], Internet: URL: https://www.ieice.org/ken/user/index.php?cmd=download&p=weGs&t=IEICE-IBISML&Id605c29d8557ef2838c888d0f0ad9acb1daa572ea0b2a70713706a7d6d39f07e&lang=.
T. Maruyama et al., "Acceralated Search for Search-Based Network Design Generation Scheme with Reinforcement Learning", IEICE Technical Report, vol. 118, No. 483, ICM2018-71, Mar. 2019.

* cited by examiner

SYSTEM DESIGN LEARNING DEVICE, SYSTEM DESIGN LEARNING METHOD, AND RECORDING MEDIUM

This application is based upon and claims the benefit of priority from Japanese patent application No. 2020-171169, filed on Oct. 9, 2020, and Japanese patent application No. 2021-087757, filed on May 25, 2021. The disclosure of these applications is incorporated herein in its entirety by reference.

TECHNICAL FIELD

The present invention relates to a system design learning device, a system design learning method, and a recording medium.

BACKGROUND ART

In PCT International Publication No. WO 2019/216082 (hereinafter Patent Document 1), system design technology for deriving a concrete system configuration that does not include an undefined part by applying a concretization rule to an undefined part of an abstract system configuration and concretizing the abstract system configuration is disclosed.

Also, in Takashi Maruyama and four others, "Accelerated Search for Search-Based Network Design Generation Scheme with Reinforcement Learning," IEICE Technical Report, vol. 118, no. 483, ICM2018-71, pp. 123-128, March 2019 (hereinafter Non-Patent Document 1), technology for learning a process of selecting any one of applicable rules with reinforcement learning in the technology as shown in Patent Document 1 is disclosed.

SUMMARY

It is considered there is a case in which obtained results differ according to which conversion rule is applied and further according to which conversion rule is applied in what order when a conversion rule is applied to a part of a system configuration such as system design technology exemplified in Patent Document 1. In particular, in the system design technology exemplified in Patent Document 1 and the like, it is also considered that there is a case in which system design fails according to which conversion rule is applied and further according to which conversion rule is applied in what order. That is, in the associated system design technology, derivation of a concrete system configuration is not always successful. For example, it is also considered that there is a case in which there are no more applicable conversion rules regardless of whether the system configuration includes an undefined part.

On the other hand, it is considered that there is a case in which learning (machine learning) such as reinforcement learning exemplified in Non-Patent Document 1 is performed with respect to conversion based on a system configuration from the viewpoint of increasing a possibility of success of the system design.

However, it is considered that there is a case in which a system configuration serving as a target during system design is different from a system configuration serving as a target during learning because the system configuration is diverse when learning related to the system configuration is performed. As described above, it is preferable to perform valid learning even if a system configuration serving as a target during system design is different from a system configuration serving as a target during learning.

An example object of the present invention is to provide a system design learning device, a system design learning method, and a recording medium capable of solving the above-described problems.

According to a first example aspect of the present invention, a system design learning device includes: at least one memory configured to store instructions; and at least one processor configured to execute the instructions to: perform, with respect to a design target system whose system requirement is shown, system design in which application of a conversion rule to a component of the design target system is iterated until a design result of the system design is obtained; determine an evaluation value for the system design based on the design result; determine an evaluation value related to conversion of each component in the system design based on the evaluation value for the system design; and learn about selection of a component to which the conversion rule is applied based on learning data including the evaluation value related to the conversion of each component.

According to a second example aspect of the present invention, a system design learning method includes: performing, with respect to a design target system whose system requirement is shown, system design in which application of a conversion rule to a component of the design target system is iterated until a design result of the system design is obtained; determining an evaluation value for the system design based on the design result; determining an evaluation value related to conversion of each component in the system design based on the evaluation value for the system design; and learning about selection of a component to which the conversion rule is applied based on learning data including the evaluation value related to the conversion of each component.

According to a third example aspect of the present invention, a non-transitory computer-readable recording medium stores a program for causing a computer to: perform, with respect to a design target system whose system requirement is shown, system design in which application of a conversion rule to a component of the design target system is iterated until a design result of the system design is obtained; determine an evaluation value for the system design based on the design result; determine an evaluation value related to conversion of each component in the system design based on the evaluation value for the system design; and learn about selection of a component to which the conversion rule is applied based on learning data including the evaluation value related to the conversion of each component.

EXAMPLE EMBODIMENT

Example embodiments of the present invention will now be described in detail with reference to the accompanying drawings. It is to be understood that the following example embodiments are not intended to limit the claims of the present invention, and that not all combinations of features described in the example embodiments are indispensable for the method to solve the problems in the present invention.

First Example Embodiment

Figure 1:
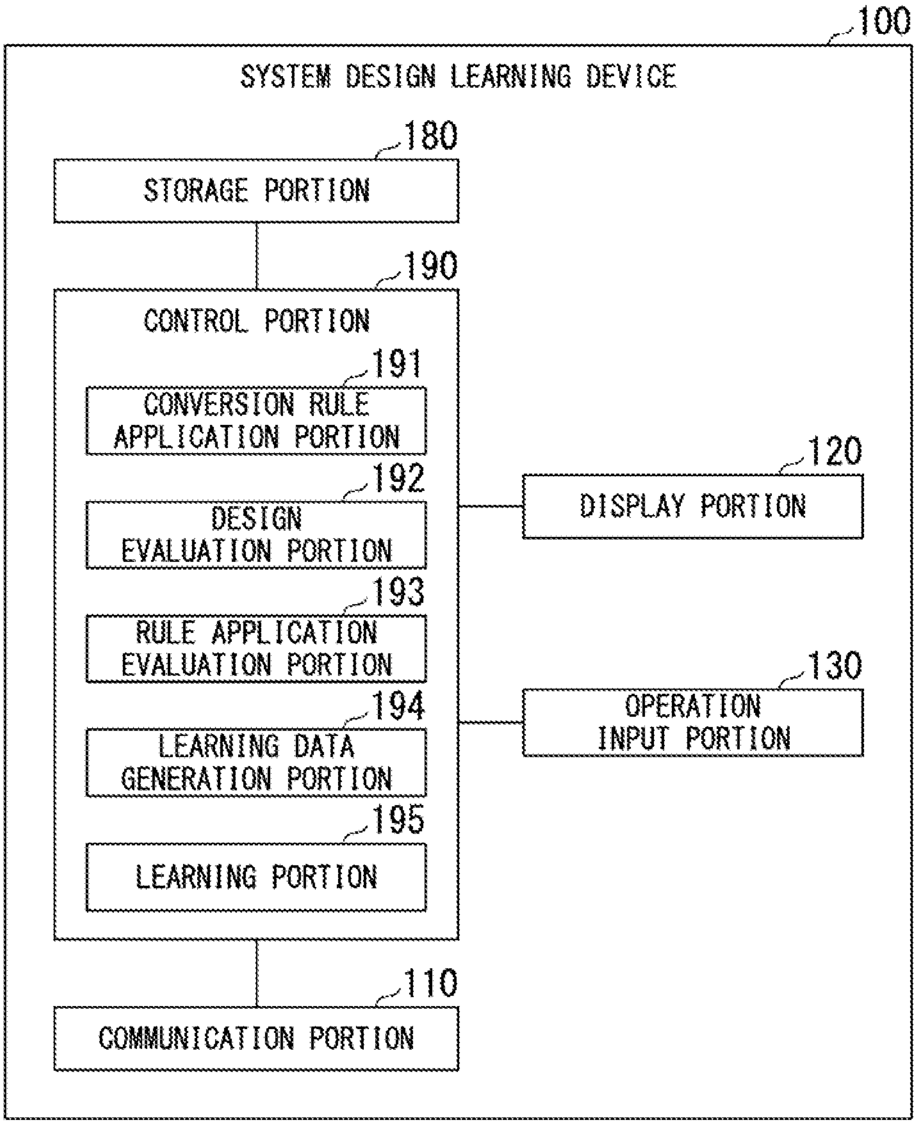
FIG. 1 is a schematic block diagram showing a functional configuration of a system design learning device according to a first example embodiment.

FIG. 1 is a schematic block diagram showing a functional configuration of a system design learning device according to a first example embodiment. In the configuration shown in FIG. 1, a system design learning device 100 includes a communication portion 110, a display portion 120, an operation input portion 130, a storage portion 180, and a control portion 190. The control portion 190 includes a conversion rule application portion 191, a design evaluation portion 192, a rule application evaluation portion 193, a learning data generation portion 194, and a learning portion 195.

The system design learning device 100 automatically or semi-automatically performs system design. The system design learning device 100 learns a process of the system design on the basis of a result of the system design. The system design learning device 100 iterates the system design using a learning result and learning using the result of the system design.

The system design learning device 100 may be configured using a computer such as a personal computer (PC) or a workstation. Alternatively, the system design learning device 100 may be configured using hardware dedicated to the system design learning device 100 as in a case in which the system design learning device 100 is configured using an application specific integrated circuit (ASIC) or the like.

In the system design, the system design learning device 100 acquires a system requirement of a design target system. The system requirement mentioned here is information in which a configuration to be provided in the system is described.

In the system requirement input to the system design learning device 100, it is possible to abstractly describe constituent elements of the design target system. The system design learning device 100 concretizes the system requirement to a level where the system is able to be deployed by iteratively applying a predetermined conversion rule to the system requirement that has been acquired.

Specifically, the design target system is configured to include one or more components. The system design learning device 100 selects any one of the components included in the design target system and applies a conversion rule for concretizing the selected component. The system design learning device 100 performs the system design by iterating the selection of a component and the application of a conversion rule.

The component mentioned here is a part capable of constituting a part of the certain system. In the system design performed by the system design learning device 100, a conversion rule is applied to the component and the design target system is concretized in units of components. The component of the system shown in the system requirement is also referred to as the component of the system requirement.

Also, in the present disclosure, a case in which the "component" represents a configuration maximally concretized to the extent that it cannot be converted into a concrete configuration any more in accordance with the configuration of the system that is desired as a deliverable, a case in which the "component" represents a configuration concretized to a desired degree (for example, a functional module for implementing a certain function), or the like is assumed. Thus, a degree of concretization of an individual component is not uniquely determined. Also, the "component" may be defined in a unit such as a "server," may be more finely defined, for example, in a unit such as a "CPU," a "memory," or a "hard disk," or may be more coarsely defined, for example, in a unit such as "a system for performing face recognition." Thus, the unit in which an individual component is defined is not uniquely determined.

Hereinafter, a case in which the system targeted by the system design learning device 100 is an information and communication technology (ICT) system will be described as an example. However, a field of a system targeted by the system design learning device 100 is not limited to a specific field.

Applying a conversion rule to the system requirement is referred to as conversion. When it is clearly stated that the conversion rule may be applied to the system requirement a plurality of times, it is called a conversion sequence. Therefore, the conversion sequence is represented by a serial connection of one or more conversions.

Figure 2:
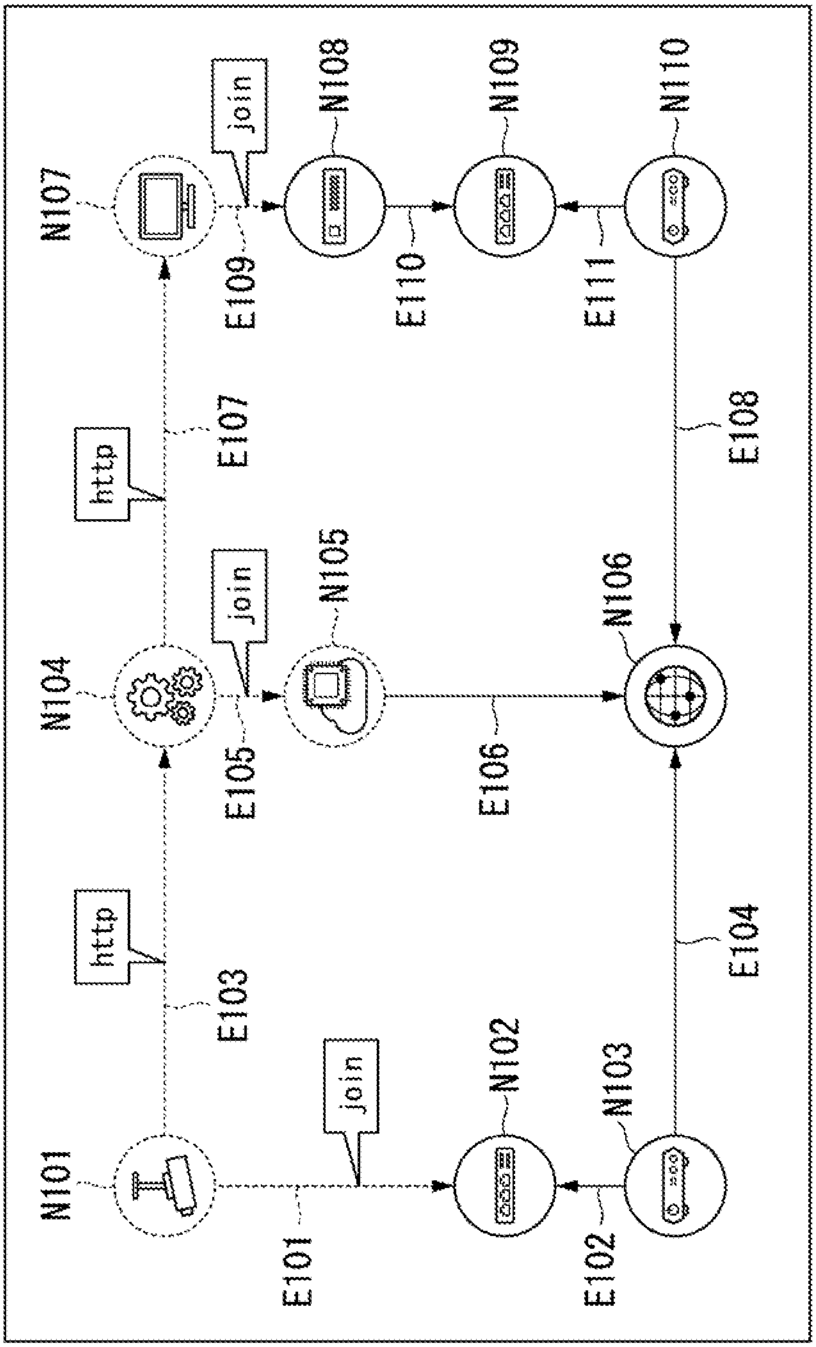
FIG. 2 is a diagram showing an example of a system requirement handled by the system design learning device according to the first example embodiment.

FIG. 2 is a diagram showing an example of a system requirement handled by the system design learning device 100. FIG. 2 shows an example of a system requirement of a design target when the system design learning device 100 designs a suspicious person detection system.

In the example of FIG. 2, the system requirement handled by the system design learning device 100 is described in the form of a directed graph and attribute information is added to each of a node and an edge. Both the node and the edge correspond to examples of the component.

For example, a name or identification information of a function or a device represented by a node may be added to the node as attribute information. In the case of the example of FIG. 2, a node N101 represents a camera function (a photography function). Nodes N102 and N109 both represent network switches. Nodes N103 and N110 both represent routers. A node N104 represents a face authentication function. A node N105 represents a cloud infrastructure. A node N106 represents a wide area network (WAN). A node N107 represents a monitor function (an image display function). A node N108 represents a server device.

Also, a degree of abstraction of the node may be added to the node as attribute information. In the case of the example of FIG. 2, the nodes N101, N104, N105, and N107 are abstract nodes. On the other hand, the nodes N102, N103, N106, N108, N109, and N110 are concrete nodes. Here, an abstract node is a node capable of being converted into a node that represents a more concrete configuration than the present by referring to a predetermined conversion rule at least once. On the other hand, a concrete node (i.e., a node concretized to a deployable level) is a node that cannot be further converted into a node representing a concrete configuration even if the conversion rule is referred to.

The system design learning device 100 applies the conversion rule to the system requirement so that an abstract node is concretized. For example, the system design learning device 100 may apply a conversion rule for converting the node N101 representing the camera function into a subgraph including a node of a camera (an imaging device) and a node of a control device for controlling the camera to the system requirement exemplified in FIG. 2.

Also, in the example of FIG. 2, attribute information "join" of each of edges E101, E105, and E109 and attribute information "http" of each of the edges E103 and E107 are shown. "join" indicates an affiliation relationship. For example, the camera function represented by the node N101 is included in a local area network (LAN) formed by the network switch represented by the node N102. The face authentication function represented by the node N104 is provided on the cloud infrastructure represented by the node N105. The monitor function represented by the node N107 is controlled using the server device represented by the node N108.

"http" represents communication using a hypertext transfer protocol (HTTP). For example, the edge E103 represents that data is transmitted according to the HTTP from the camera function represented by the node N101 to the face authentication function represented by the node N105. The edge E107 represents that data is transmitted according to the HTTP from the face authentication function represented by the node N105 to the monitor function represented by the node N107.

Also, the degree of abstraction of the edge may be added as attribute information to the edge. In the case of the example of FIG. 2, the edges E101, E103, E105, E107, and E109 are abstract edges. On the other hand, edges E102, E104, E106, E108, E110, and Ell' are concrete edges. Here, an abstract edge is an edge capable of being converted into an edge that represents a more concrete configuration than the present by referring to a predetermined conversion rule at least once. On the other hand, a concrete edge is an edge that cannot be converted into an edge that represents a concrete configuration any more even if the conversion rule is referred to (i.e., an edge concretized to a deployable level).

The conversion rule used by the system design learning device 100 may include a conversion rule for concretizing the edge.

Figure 3:
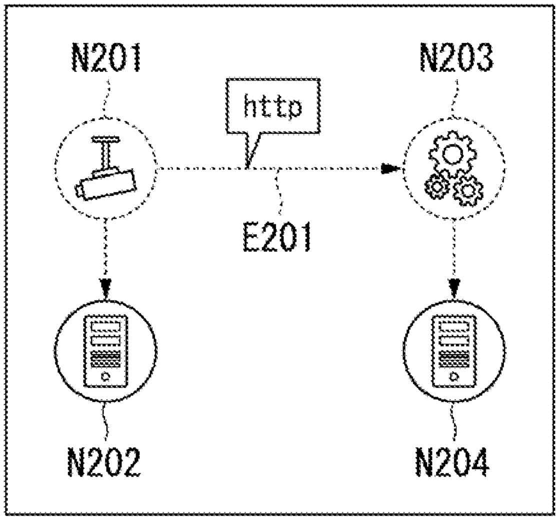
FIG. 3 is a diagram showing an example of a system requirement before application of a conversion rule according to the first example embodiment.

FIG. 3 is a diagram showing an example of a system requirement before the application of the conversion rule.

In the system requirement shown in FIG. 3, the camera function represented by the node N201 is connected to the workstation represented by the node N202. Also, the face authentication function represented by the node N203 is executed on the workstation represented by the node N204. It is assumed that the edge E201 represents that data is transmitted according to the HTTP from the camera function represented by the node N201 to the face authentication function represented by the node N203.

Figure 4:
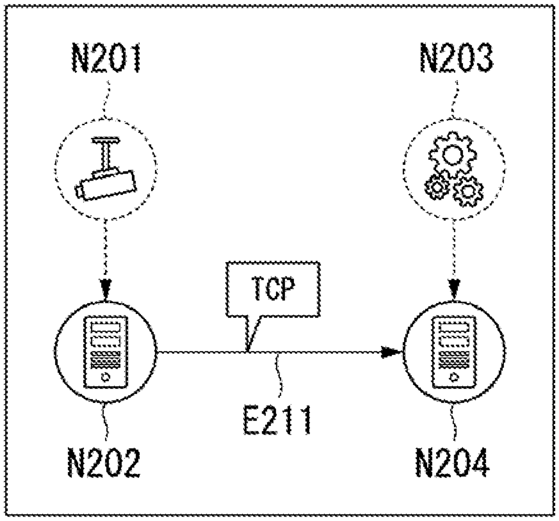
FIG. 4 is a diagram showing an example of a system requirement after application of the conversion rule according to the first example embodiment.

FIG. 4 shows an example of a system requirement after the application of the conversion rule. FIG. 4 shows an example in which the conversion rule is applied to the system requirement shown in FIG. 3.

In FIG. 4, an edge E211 is provided instead of the edge E201 of FIG. 3. It is assumed that the edge E211 represents that data is transmitted from the workstation represented by the node N202 to the workstation represented by the node N204 using a transmission control protocol (TCP). That is, FIG. 4 shows that conversion for concretizing the communication using the HTTP to the communication using the TCP is performed by applying the conversion rule to the system requirement of FIG. 3.

However, the system targeted by the system design learning device 100 can be any of various systems including components. Methods of expressing the system targeted by the system design learning device 100 can be various expression methods to which the conversion rule can be applied by identifying a type of component.

An event occurs in which content (a configuration) represented by the system requirement after conversion is different according to which of a plurality of predetermined conversion rules is applied to the system requirement by the system design learning device 100 and further according to the order in which the system design learning device 100 applies the plurality of conversion rules to the system requirement. In particular, according to the conversion rule applied to the system requirement and the order in which the plurality of conversion rules are applied to the system requirement, the system design learning device 100 classifies a result of the system design as a case in which the system design succeeds or a case in which the system design fails. In other words, the objective of the system design learning device 100 is to concretize the system requirement to a level where the system is able to be deployed. However, when the system design learning device 100 has some of the constituent elements of the system that are still abstractly described, but there are no more applicable conversion rules, this typically (basically) indicates a failure of the system design of the system design learning device 100.

In order to increase a possibility that the system design of the system design learning device 100 will succeed, it is conceivable to learn the conversion rule that is applied to the system requirement. However, valid learning is generally considered difficult due to various scales and configurations of the system.

For example, it is considered that there is a case in which a system configuration serving as a target during system design is different from a system configuration serving as a target during learning when a system design model, which outputs a series of conversion rules to be applied to the input of the system requirement, is learned. Thereby, it is considered that there is a case in which the system requirement given during the system design is different from the system requirement given as learning data and a series of conversion rules to be applied cannot be appropriately determined.

Therefore, the system design learning device 100 determines evaluation for the application of an individual conversion rule on the basis of a result of the system design in which the application of the conversion rule is iterated. The system design learning device 100 aggregates the evaluation for the application of the conversion rule for each component to which the conversion rule is applied and determines the evaluation for the component. The system design learning device 100 learns a component evaluation model for outputting evaluation for each component shown in the system requirement in response to an input of the system requirement using the evaluation for the component.

The system design learning device 100 performs the system design in which the application of the conversion rule to the input system requirement is iterated using the learned component evaluation model.

The system design learning device 100 may be configured to evaluate a system requirement obtained by applying one conversion rule to the current system requirement using the component evaluation model. The system design learning device 100 may be configured to select and apply a conversion rule that has highest evaluation of the system requirement after the application of the conversion rule among conversion rules applicable to the current system requirement.

Alternatively, the system design learning device 100 may be configured to select a component having the highest evaluation among the components of the current system requirement as the component to which the conversion rule is applied.

The current system requirement mentioned here is a system requirement that is input to the system design learning device 100 or a system requirement obtained by applying the conversion rule to the input system requirement. The evaluation of the system requirement is calculated according to, for example, a maximum value of evaluation values of the components included in the system requirement.

Alternatively, the system design learning device 100 may be configured to calculate a value other than a maximum value, such as the total evaluation value of the components included in the system requirement, or a minimum value, as the evaluation value of the system requirement.

Even if a system configuration for use in a field targeted by the system design learning device 100 differs according to each system, common components or similar components are expected to be used. When the system design learning device 100 learns about conversion in units of components, components identical or similar to the components that are used in the target system during the system design are also expected to be used in the target system during the learning. In this respect, the system design learning device 100 learns about conversion in units of components, so that valid learning can be performed even if a system configuration serving as a target during system design is different from a system configuration serving as a target during learning.

The communication portion 110 communicates with other devices. For example, the communication portion 110 may be configured to receive a design target system requirement from another device.

The display portion 120 includes a display screen such as a liquid crystal panel or a light emitting diode (LED) panel and displays various types of images. For example, the display portion 120 may be configured to display a result of the system design of the system design learning device 100 such as displaying whether or not the system design of the system design learning device 100 has succeeded and displaying a system requirement when the system design has succeeded.

The operation input portion 130 includes, for example, an input device such as a keyboard and a mouse and receives user operations. For example, the operation input portion 130 may be configured to receive a user operation so that an instruction for starting the system design is issued.

The storage portion 180 memorizes various types of data. For example, the storage portion 180 stores a component evaluation model, system requirements such as an input system requirement and a current system requirement, and application rules. The storage portion 180 is configured using the storage device provided in the system design learning device 100.

The control portion 190 controls each part of the system design learning device 100 to perform various types of processes. The function of the control portion 190 is executed by the central processing unit (CPU) provided in the system design learning device 100 reading a program from the storage portion 180 and executing the program.

The conversion rule application portion 191 performs system design in which application of a conversion rule to a component of a design target system is iterated until a design result of the system design is obtained with respect to the design target system whose system requirement is shown. The conversion rule application portion 191 corresponds to an example of a conversion rule application means.

The success of the system design (the fact that the system design has succeeded) includes the fact that a system requirement concretized at a level where a system is able to be deployed has been obtained.

The failure of the system design (the fact that the system design has failed) includes the fact that it is determined that a system requirement concretized at a level where a system is able to be deployed has not been obtained. For example, when the system requirement is not concretized to the level where the system is able to be deployed and there are no conversion rules applicable to the system requirement, the conversion rule application portion 191 determines that the system design has failed.

Also, it is considered that there is a case in which the application of the conversion rule to the system requirement will fall into a loop according to the conversion rule. Even if there is a conversion rule applicable to the system requirement, the conversion rule application portion 191 determines that the system design has failed when there is no conversion sequence (application of one or more conversion rules) that does not form a loop.

The conversion rule application portion 191 may be configured to determine that the system design has failed when the system design has not succeeded even if the application of the conversion rule in the system design is iterated a prescribed number of times. That is, the failure of the system design may include the fact that the system design has not succeeded even if the application of the conversion rule in the system design is iterated a prescribed number of times.

The conversion rule application portion 191 generates history information of the system design when the system design is performed. The history information generated by the conversion rule application portion 191 is used to determine an evaluation value of the system requirement and an evaluation value of the component included in the system requirement and to generate learning data.

Figure 5:
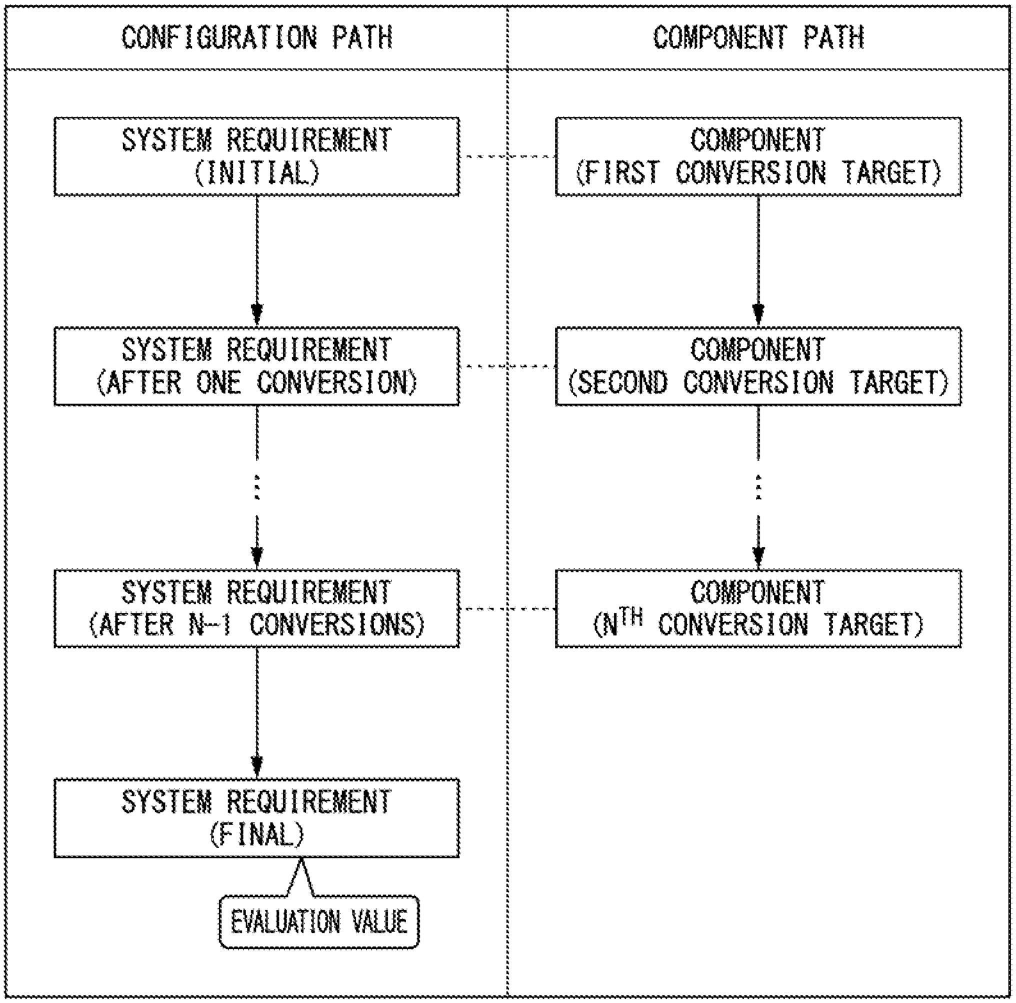
FIG. 5 is a diagram showing an example of system design history information generated by a conversion rule application portion according to the first example embodiment.

FIG. 5 is a diagram showing an example of history information of the system design generated by the conversion rule application portion 191. In the example of FIG. 5, the conversion rule application portion 191 generates a configuration path and a component path as the history information of the system design.

The configuration path shows a system requirement for each conversion rule applied in a time series from an initial system requirement to a final system requirement. The initial system requirement mentioned here is a system requirement given to the system design learning device 100 as a system requirement that is a target of the system design. The initial system requirement may be given from outside the system design learning device 100. Alternatively, the system design learning device 100 may be configured to generate an initial system requirement for learning data acquisition.

The final system requirement mentioned here is a system requirement when the design result of the system design has been obtained. The design result of the system design mentioned here can be some evaluable result of the system design. Although a case in which the result of success or failure of the system design is obtained as the design result will be described as an example hereinafter, an example embodiment of the present invention is not limited thereto.

In the example of FIG. 5, the number of times the conversion rule is applied from the initial system requirement to the final system requirement is set to N. N is a positive integer.

In the example of FIG. 5, the configuration path is configured as time-series data of N+1 system requirements. The component path is configured as time-series data of N components.

An $i^{th}$ conversion target component shown in the component path is included in an $i^{th}$ system requirement in time-series order in the configuration path. Here, i is an integer of $1 \le i \le N$.

The final system requirement corresponds to the system requirement after the conversion rule is applied N times. In the final system requirement, the result of success or failure of the system design is obtained, so that the design evaluation portion 192 can determine an evaluation value for one system design. For example, the design evaluation portion 192 sets the evaluation value of one system design to 1 when the result of the system design indicates the success, and sets the evaluation value of one system design to 0 when the result of the system design indicates the failure.

A series of iterations of component selection and conversion rule application from the initial system requirement to the final system requirement is referred to as one system design or is simply referred to as system design.

The conversion rule application portion 191 may be configured to generate history information indicating a history of applied conversion rules in addition to a history of system requirements and a history of the components to which the conversion rules are applied as the history information of the system design.

The design evaluation portion 192 determines an evaluation value for the system design on the basis of a design result of the system design. As described above, the design evaluation portion 192 may be configured to determine the evaluation value of the system design as 1 when the conversion rule application portion 191 has succeeded in performing the system design. The design evaluation portion 192 may be configured to determine the evaluation value of the system design as 0 when the conversion rule application portion 191 has failed in performing the system design.

The design evaluation portion 192 corresponds to an example of a design evaluation means.

The design evaluation portion 192 may be configured to determine the evaluation value for the system design on the basis of an obtained system evaluation index value when the conversion rule application portion 191 has succeeded in performing the system design in addition to the result of the success or failure of the system design. Various types of evaluation index values can be used as the system evaluation index value here. For example, although the design evaluation portion 192 may be configured to use an evaluation index value of a system processing speed, an evaluation index value of reliability, an evaluation index value of construction cost, an evaluation index value of operation cost, or a combination thereof, an example embodiment of the present invention is not limited thereto.

The design evaluation portion 192 may be configured to pre-store a calculation formula for calculating the system evaluation index value on the basis of the components used in the system. Alternatively, the design evaluation portion 192 may be configured to pre-acquire a model for outputting the system evaluation index value in response to the input of the system requirement according to learning.

The rule application evaluation portion 193 determines an evaluation value related to the conversion of an individual component in the system design on the basis of the evaluation value for the system design. Specifically, the rule application evaluation portion 193 determines the evaluation value related to the conversion of each component on the basis of data in which a plurality of histories of the system design are integrated for the same component. Data obtained by integrating a plurality of histories of the system design for the same component is referred to as integrated data.

The rule application evaluation portion 193 corresponds to an example of a rule application evaluation means.

Figure 6:
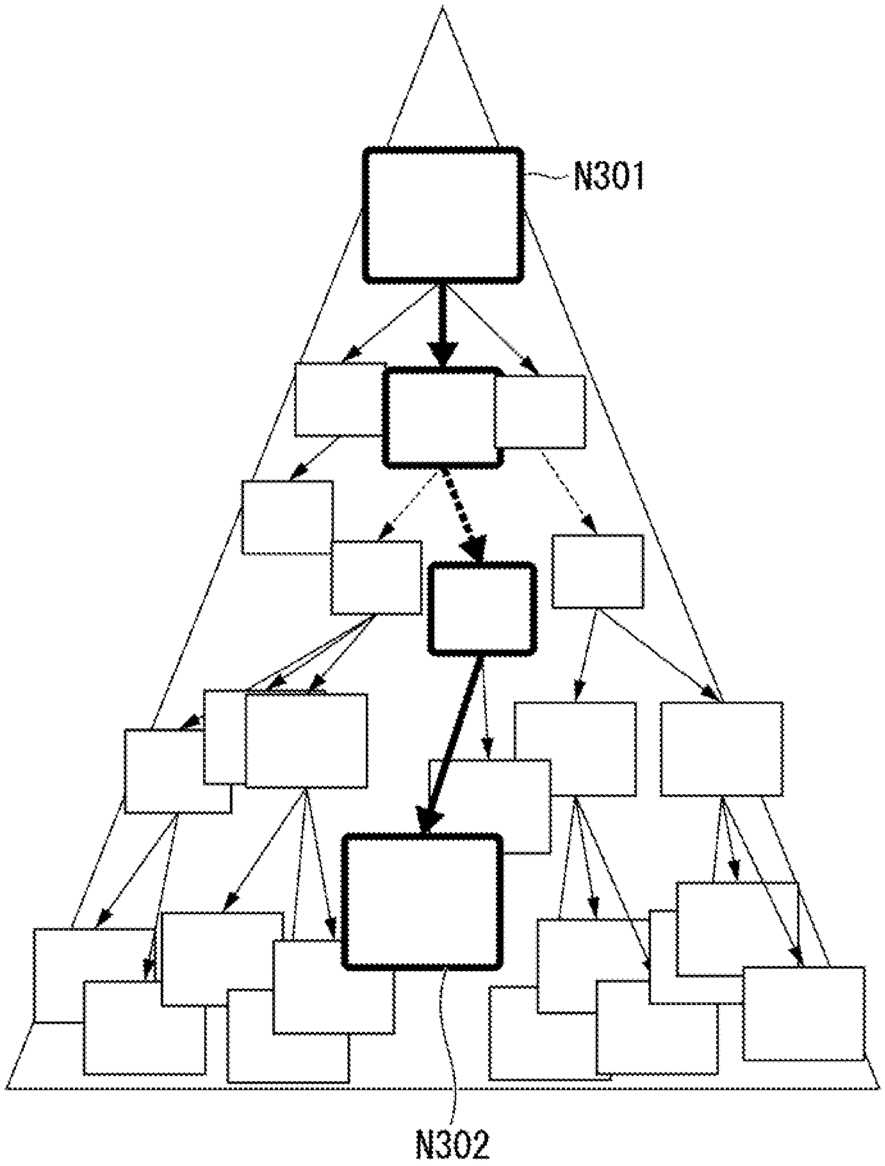
FIG. 6 is a diagram showing an example of integrated data according to the first example embodiment.

FIG. 6 is a diagram showing an example of integrated data. FIG. 6 shows an example when the integrated data is represented by a tree. A tree node exemplified in FIG. 6 represents a system requirement and an edge represents a conversion rule. The edge extends from a node before the application of the conversion rule to a node after the application of the conversion rule. A plurality of edges emanating from a node represent a plurality of conversion rules applicable to the same system requirement.

A node N301 is a root. A node N302 is one of leaves. One path from the root to the leaf such as a path from the node N301 to the node N302 indicates one system design. In this case, if the system requirement represented by the leaf is concretized at a deployable level, the design evaluation portion 192 evaluates the result of the system design as the success. On the other hand, if the system requirement represented by the leaf is not concretized to a deployable level, the design evaluation portion 192 evaluates the result of the system design as the failure.

The node at the start of the system design is not limited to the root. For example, when a system requirement concretized to some extent as a design target system requirement is input to the system design learning device 100, a node other than the root can be a node at the start of the system design.

Also, the node at the end of the system design is not limited to the leaf. For example, it is considered that there is a case in which the system requirement is concretized at a deployable level in a node other than the leaf and the system design ends when a rule for replacing a concretized component with another concretized component is included as one of the conversion rules.

The integrated data can be represented by various directed graphs as well as trees in accordance with the conversion rule for use in the system design. For example, when the same second system requirement can be obtained even if any one of different conversion sequences is applied to the initial system requirement, there are a plurality of paths from the first node to the second node in the integrated data. In this case, the integrated data may be represented by a lattice.

Also, when there is a conversion rule for applying the conversion rule to a certain system requirement once or more and returning to the system requirement, the integrated data may be shown in a directed graph containing a loop. The design evaluation portion 192 may be configured to evaluate the result of the system design as the failure with respect to the node included in the loop when there is no path exiting the above loop and a system requirement concretized at a deployable level is not obtained in any node included in the loop.

The integrated data may contain two or more subgraphs that are independent of each other. The fact that the two subgraphs are independent of each other here means that there is no path from the first subgraph to the second subgraph of the two subgraphs, and that there is no path from the second subgraph to the first subgraph. For example, the integrated data may be represented by a forest.

Figure 7:
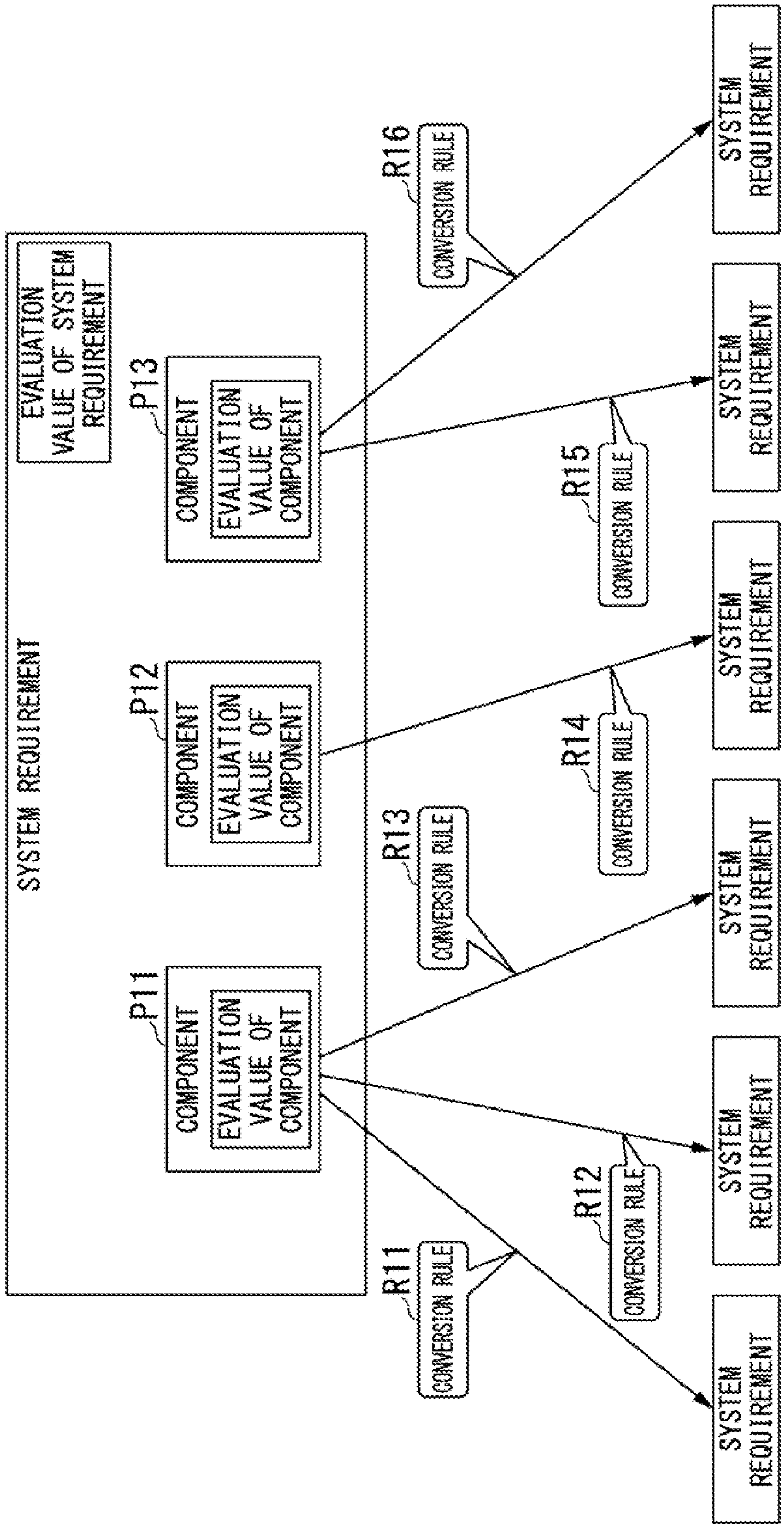
FIG. 7 is a diagram showing an example of a corresponding relationship between a node and a component in the integrated data according to the first example embodiment.

FIG. 7 is a diagram showing an example of a corresponding relationship between the node and the component in the integrated data. The system requirement shown in FIG. 7 is represented by a node in the integrated data.

In the example of FIG. 7, the system requirement before the application of the conversion rule includes three components P11, P12, and P13. Three conversion rules R11, R12, and R13 can be applied to the component P11. One conversion rule R14 can be applied to the component P12. Two conversion rules R15 and R16 can be applied to the component P13.

As described above, the edge of the integrated data is a directed edge that represents the conversion rule. A start end (an end of a start point side) of the above directed edge is connected to the node representing the system requirement before conversion and a finish end (an end of a finish point side) is connected to the node representing the system requirement after conversion.

Also, the edges emanating from one node are grouped for each component included in the system requirement represented by the above node as exemplified in FIG. 7. This grouping may be shown in the integrated data. For example, as in FIG. 7, a component of a constituent requirement may be shown in the node of the integrated data and the start point of the edge may be connected to any component to show the grouping.

The number of components provided in the system requirement and the number of conversion rules applicable to one component are not limited to any specific number. The number of components provided in the system requirement may differ between before and after the conversion rule is applied. The number of conversion rules applicable to a component may differ according to each component.

Also, in the example of FIG. 7, a case in which the system design learning device 100 calculates an evaluation value of the system requirement and an evaluation value for each component in the system requirement is shown.

The evaluation value of the system requirement is written to the node in the integrated data.

On the other hand, the evaluation value for each component in the system requirement is calculated when the learning data is generated and incorporated into the learning data.

It is not necessary to provide a storage area for the evaluation value of the component in the system requirement in the node of the integrated data.

The learning data generation portion 194 generates learning data for learning the component evaluation model. In particular, the learning data generation portion 194 generates learning data including an evaluation value related to the conversion of a component. Specifically, the learning data generation portion 194 generates learning data including a system requirement, any one of the components included in the system requirement, and an evaluation value of the component in the system requirement.

The learning portion 195 learns about the selection of the component to which the conversion rule is applied on the basis of the learning data generated by the learning data generation portion 194 and including the evaluation value related to the conversion of the component. Specifically, the learning portion 195 learns the component evaluation model.

The learning portion 195 corresponds to an example of a learning means.

Alternatively, the learning portion 195 may be configured to learn about the selection of a conversion rule to be applied to the system requirement when conversion rules are predetermined in common to system designs that are performed by the system design learning device 100. That is, the learning portion 195 may be configured to learn about the selection of a conversion rule applicable to the component further subdivided from the selection of the components included in the system requirement. Specifically, the learning portion 195 may be configured to learn the conversion rule evaluation model that receives the input of the system requirement and outputs the evaluation value of each of the conversion rules applicable to the system requirement.

Figure 8:
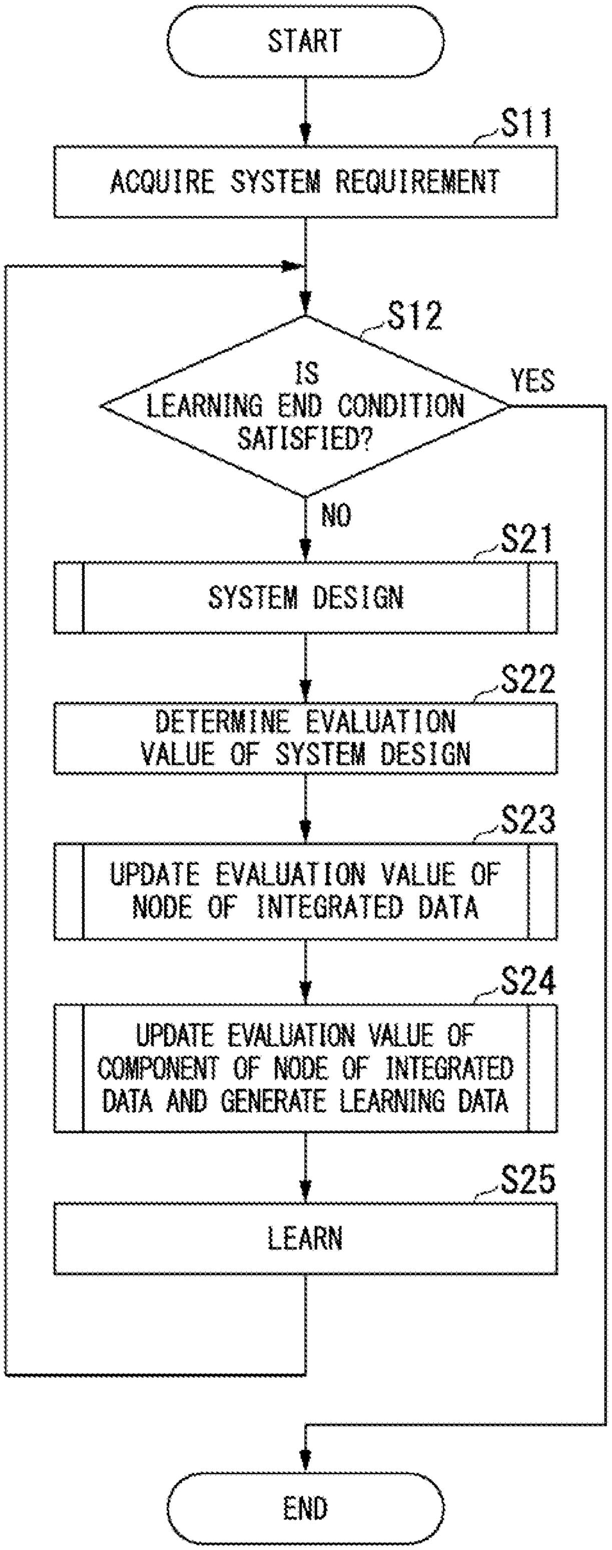
FIG. 8 is a flowchart showing an example of a processing procedure in which the system design learning device according to the first example embodiment generates learning data and performs learning.

FIG. 8 is a flowchart showing an example of a processing procedure in which the system design learning device 100 generates learning data and performs learning.

In the process of FIG. 8, the system design learning device 100 acquires a learning target system requirement (step S11). The system design learning device 100 may also be configured to use the system requirement given as the design target system requirement as the learning target system requirement. Alternatively, the system design learning device 100 may be configured to acquire the learning target system requirement separately from the design target system requirement.

Subsequently, the control portion 190 determines whether or not a learning end condition is satisfied (step S12). The learning end condition may be based on, but is not limited to, a learning time period, the number of learning processes (the number of times the loop of steps S12 to S24 is iterated), a magnitude of a learning error, and the like.

When the control portion 190 determines that the end condition is satisfied (step S12: YES), the system design learning device 100 ends the process of FIG. 8.

On the other hand, when the control portion 190 determines that the end condition is not satisfied (step S12: NO), the conversion rule application portion 191 performs system design for the learning target system requirement (step S21). Specifically, the conversion rule application portion 191 iterates the application of the conversion rule to the learning target system requirement until the result of success or failure of the system design is obtained. During the system design, the conversion rule application portion 191 generates a configuration path and a component path. Also, when the integrated data does not includes a node representing the system requirement appearing in the system design, the conversion rule application portion 191 adds the node representing the system requirement appearing in the system design to the integrated data.

FIG. 8 shows an example in which the system design learning device 100 acquires a plurality of system requirements in step S11 and performs design for an individual system requirement in step S21. Alternatively, the system design learning device 100 may be configured to acquire one system requirement and perform system design for the acquired system requirement every time step S21 is executed instead of acquiring the system requirement in step S11.

Also, the system design learning device 100 may be configured to perform the system design for a different system requirement every time the processing of step S21 is performed. Alternatively, the system design learning device 100 may perform system design with a conversion sequence different from the conversion sequence in the design in the previous step S21 with respect to a system requirement which is the same as the system requirement for which the system design has been performed in the previous processing of step S21.

Subsequently, the design evaluation portion 192 determines an evaluation value for the system design performed by the conversion rule application portion 191 (step S22).

For example, on the basis of whether the design evaluation portion 192 has succeeded or failed in performing the system design, the design evaluation portion 192 sets the evaluation value for the system design to 1 when the conversion rule application portion 191 has succeeded in performing the system design and sets the evaluation value for the system design to 0 when the conversion rule application portion 191 has failed in performing the system design.

Alternatively, when the conversion rule application portion 191 has succeeded in performing the system design, the design evaluation portion 192 may be configured to determine an evaluation value for the system design on the basis of an obtained system evaluation value.

Next, the rule application evaluation portion 193 updates the evaluation value of the node of the integrated data on the basis of the evaluation value of the system design determined in step S22 (step S23). For example, the rule application evaluation portion 193 determines the evaluation value of the node of the integrated data as a largest evaluation value (an evaluation value having highest evaluation) among evaluation values of nodes that are children of the node.

Subsequently, the rule application evaluation portion 193 determines the evaluation values of the components included in the system requirement and determines the evaluation value of each component in the component path and the learning data generation portion 194 generates and stores learning data (step S24).

The learning portion 195 learns a component evaluation model using the learning data generated by the learning data generation portion 194 (step S25). As described above, the component evaluation model is a model for outputting the evaluation for each component shown in the system requirement in response to an input of the system requirement.

After step S25, the process returns to step S12.

Figure 9:
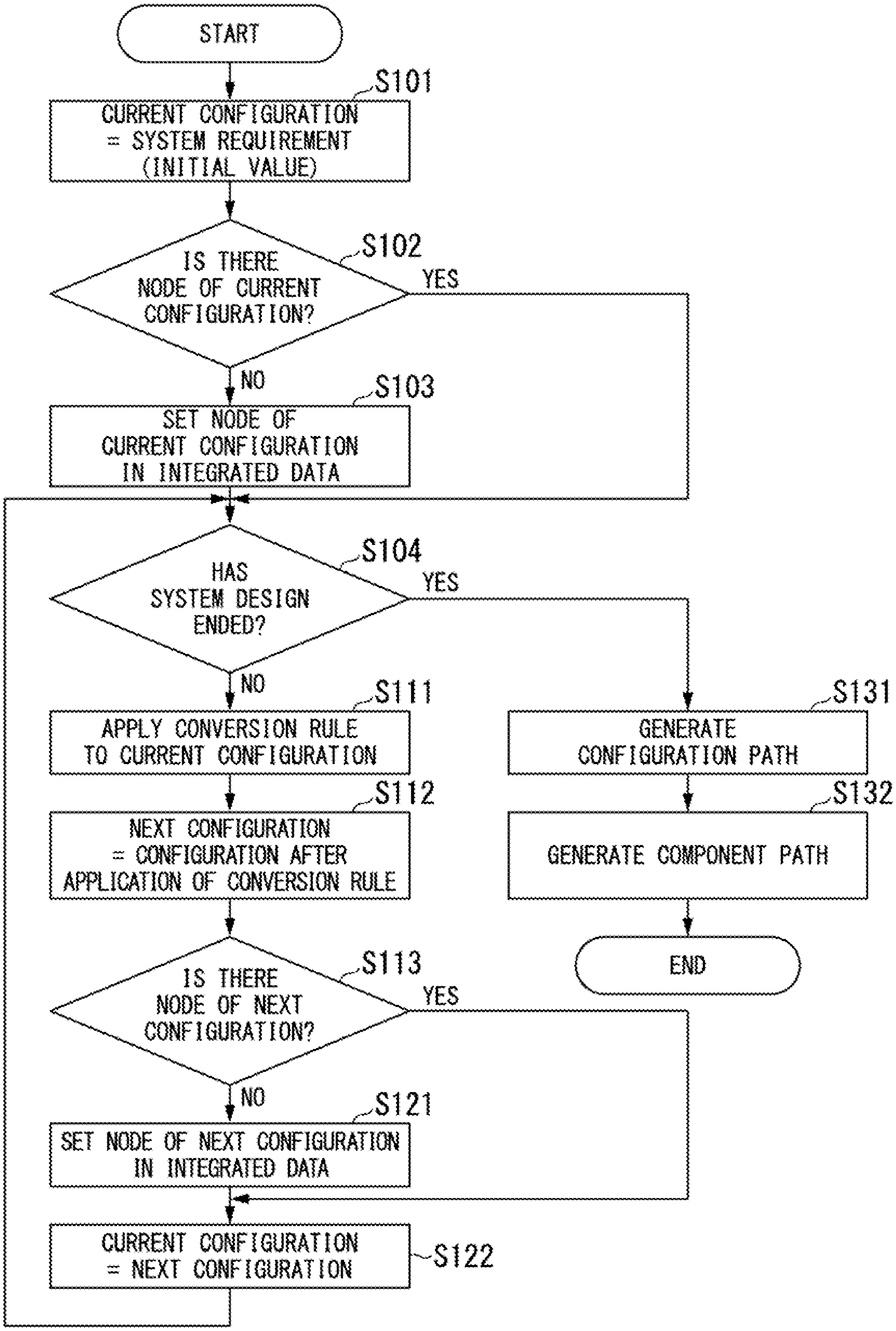
FIG. 9 is a flowchart showing an example of a processing procedure in which the system design learning device according to the first example embodiment performs system design.

FIG. 9 is a flowchart showing an example of a processing procedure in which the system design learning device 100 performs system design. The system design learning device 100 performs the process of FIG. 9 in step S21 of FIG. 8. As described above with respect to step S21 of FIG. 8, the system design learning device 100 generates a configuration path and a component path during the system design and sets a node of integrated data.

In the process of FIG. 9, a "current configuration" variable and a "next configuration" variable are used as variables having values of the system requirement. A system requirement shown as the value of the "current configuration" variable is referred to as a "current configuration." A system requirement shown as the value of the "next configuration" variable is referred to as a "next configuration."

In the process of FIG. 9, the conversion rule application portion 191 stores a system requirement received in step S11 of FIG. 8 in the "current configuration" variable (step S101). That is, the conversion rule application portion 191 sets the system requirement received in step S11 of FIG. 8 as an initial value of the "current configuration" variable.

Subsequently, the conversion rule application portion 191 determines whether or not the "current configuration" has been registered as a node in the integrated data (step S102). For example, the conversion rule application portion 191 compares a system requirement shown in each node in the integrated data with the "current configuration."

When it is determined that the "current configuration" has not been registered as the node in the integrated data (step S102: NO), the conversion rule application portion 191 registers the "current configuration" as the node in the integrated data (step S103). Registering the system requirement as the node in the integrated data means providing a new node representing the system requirement.

Subsequently, the conversion rule application portion 191 determines whether or not the end condition of the system design is satisfied (step S104). For example, the conversion rule application portion 191 may be configured to determine that the end condition of the system design is satisfied when there is no concretization rule applicable to the "current configuration" or when the "current configuration" has been concretized to a deployable level.

When it is determined that the end condition is not satisfied (step S104: NO), the conversion rule application portion 191 selects one component to be concretized from the "current configuration" and applies the conversion rule to the selected component (step S111). By applying the conversion rule, the conversion rule application portion 191 concretizes the component.

The conversion rule application portion 191 stores the system requirement after the application of the conversion rule in step S111 in the "next configuration" variable (step S112).

Next, the conversion rule application portion 191 determines whether or not the "next configuration" has been registered as the node in the integrated data (step S113). For example, the conversion rule application portion 191 compares the system requirement represented by each node in the integrated data with the "next configuration."

When it is determined that the "next configuration" has not been registered as the node in the integrated data (step S113: NO), the conversion rule application portion 191 registers the "next configuration" as the node in the integrated data (step S121). Specifically, the conversion rule application portion 191 provides the node representing the "next configuration" in the integrated data. The conversion rule application portion 191 extends an edge between the nodes with the node representing the "current configuration" as a parent node and the node representing the "next configuration" as a child node on the integrated data. The above edge represents the application of the conversion rule in step S111.

The conversion rule application portion 191 stores the "next configuration" in the "current configuration" variable (step S122).

After step S122, the process transitions to step S104.

On the other hand, when the conversion rule application portion 191 determines that the "next configuration" has been registered as a node in the integrated data in step S113 (step S113: YES), the process transitions to step S122. Therefore, in this case, the conversion rule application portion 191 does not perform a process of setting the node of the integrated data in step S121.

On the other hand, when it is determined that the end condition is satisfied in step S104 (step S104: YES), the conversion rule application portion 191 sets a path obtained by arranging system requirements appearing in the current process of FIG. 9 in time-series order as a configuration path (step S131). Further, the conversion rule application portion 191 sets a path obtained by arranging components selected as the application target of the conversion rule in step S111 among the components included in the system requirements within the configuration path in time-series order (step S132).

After step S132, the system design learning device 100 ends the process of FIG. 9.

On the other hand, when the conversion rule application portion 191 determines that the "current configuration" has already been registered as a node for integrated data in step S102, the process transitions to step S104. Therefore, in this case, the conversion rule application portion 191 does not perform the process of setting the node of the integrated data in step S103.

Figure 10:
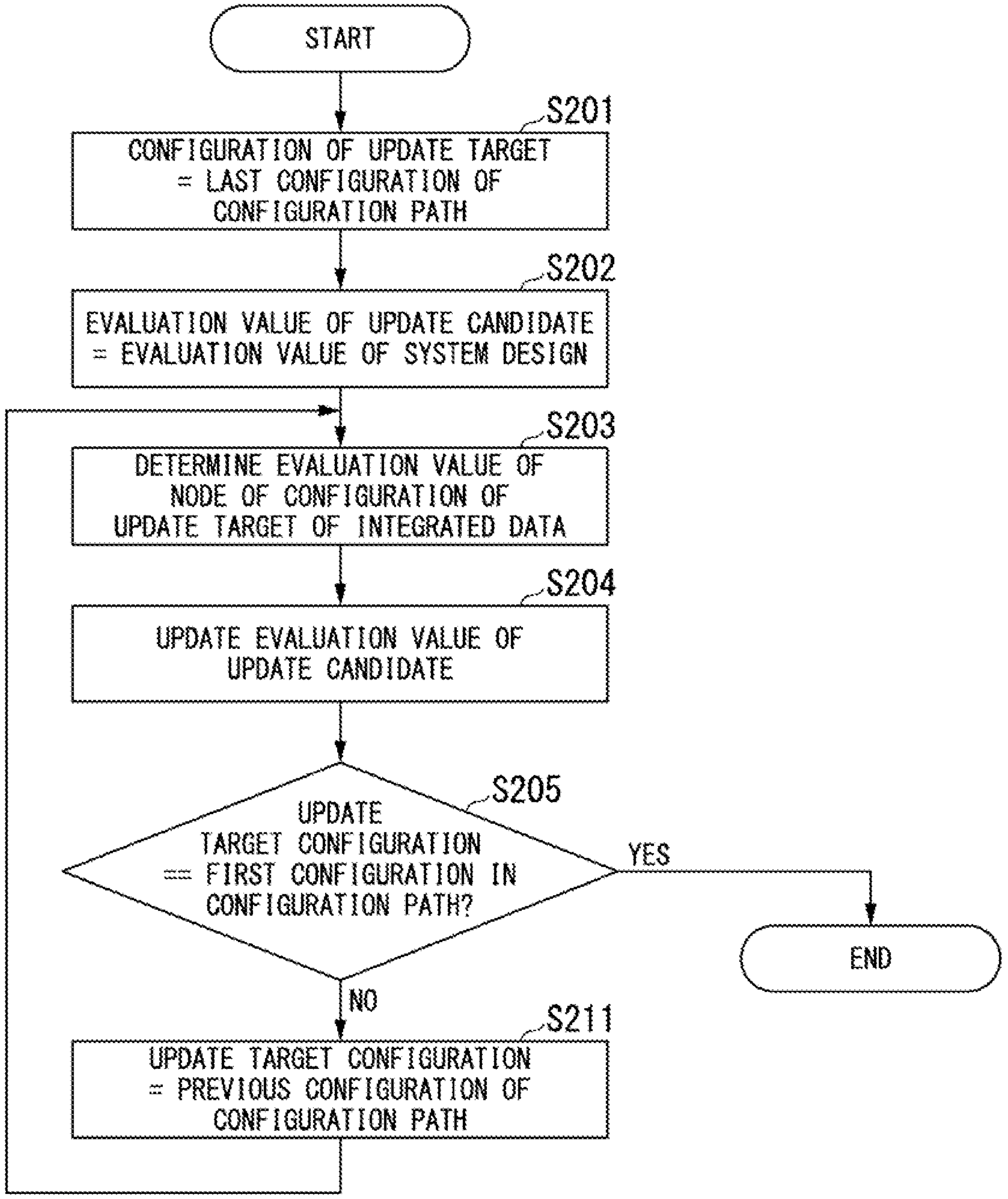
FIG. 10 is a flowchart showing an example of a processing procedure in which the system design learning device according to the first example embodiment updates an evaluation value shown in a node of the integrated data.

FIG. 10 is a flowchart showing an example of a processing procedure in which the system design learning device 100 updates the evaluation value shown in the node of the integrated data. The system design learning device 100 performs the process of FIG. 10 in step S23 of FIG. 8.

In the process of FIG. 10, an "update candidate evaluation value" variable is used as a variable having the evaluation value of the system requirement as a value. Also, in the process of FIG. 10, an "update target configuration" variable is used as a variable having a pointer indicating any one of the system requirements included in the configuration path as a value. The evaluation value shown as the value of the "update candidate evaluation value" variable is referred to as an "update candidate evaluation value." The system requirement indicated by the value of the "update target configuration" variable is referred to as the "update target configuration."

In the process of FIG. 10, the rule application evaluation portion 193 sets the system requirement represented by the last node of the configuration path as the "update target configuration" (step S201). That is, the rule application evaluation portion 193 sets the value of the "update target configuration" variable so that the value of the "update target configuration" variable indicates the last node of the configuration path. Nodes in the configuration path are individual system requirements included in the configuration path.

Also, the rule application evaluation portion 193 sets the initial value of the "update candidate evaluation value" variable to the evaluation value of the system design determined in step S22 of FIG. 8 (step S202).

Next, the rule application evaluation portion 193 determines the evaluation value of the node representing the "update target configuration" in the integrated data (step S203). The evaluation value of the node of the integrated data is the evaluation value of the system requirement represented by the node.

Specifically, the rule application evaluation portion 193 compares the evaluation value of the node representing the "update target configuration" in the integrated data with the "update candidate evaluation value." When the "update candidate evaluation value" is larger, the rule application evaluation portion 193 updates the evaluation value of the node representing the "update target configuration" in the integrated data to the "update candidate evaluation value." On the other hand, when the evaluation value of the node representing the "update target configuration" in the integrated data is larger, the rule application evaluation portion 193 takes the evaluation value of the node representing the "update target configuration" in the integrated data as it is.

When the evaluation value of the node is not set, the rule application evaluation portion 193 considers that 0 is set as the evaluation value of the node and performs processing.

Next, the rule application evaluation portion 193 updates the value of the "update candidate evaluation value" (step S204). Specifically, the rule application evaluation portion 193 sets the value determined to be the evaluation value of the node representing the "update target configuration" in the integrated data in step S203 as the "update candidate evaluation value."

Next, the rule application evaluation portion 193 determines whether or not the "update target configuration" is a first system requirement of the configuration path (step S205).

When the rule application evaluation portion 193 determines that the "update target configuration" is a first system requirement of the configuration path (step S205: YES), the system design learning device 100 ends the process of FIG. 10.

On the other hand, when it is determined that the "update target configuration" is not a first system requirement of the configuration path (step S205: NO), the rule application evaluation portion 193 sets a system requirement immediately before the "update target configuration" on the configuration path as the "update target configuration" (step S211).

After step S211, the process returns to step S203.

Figure 11:
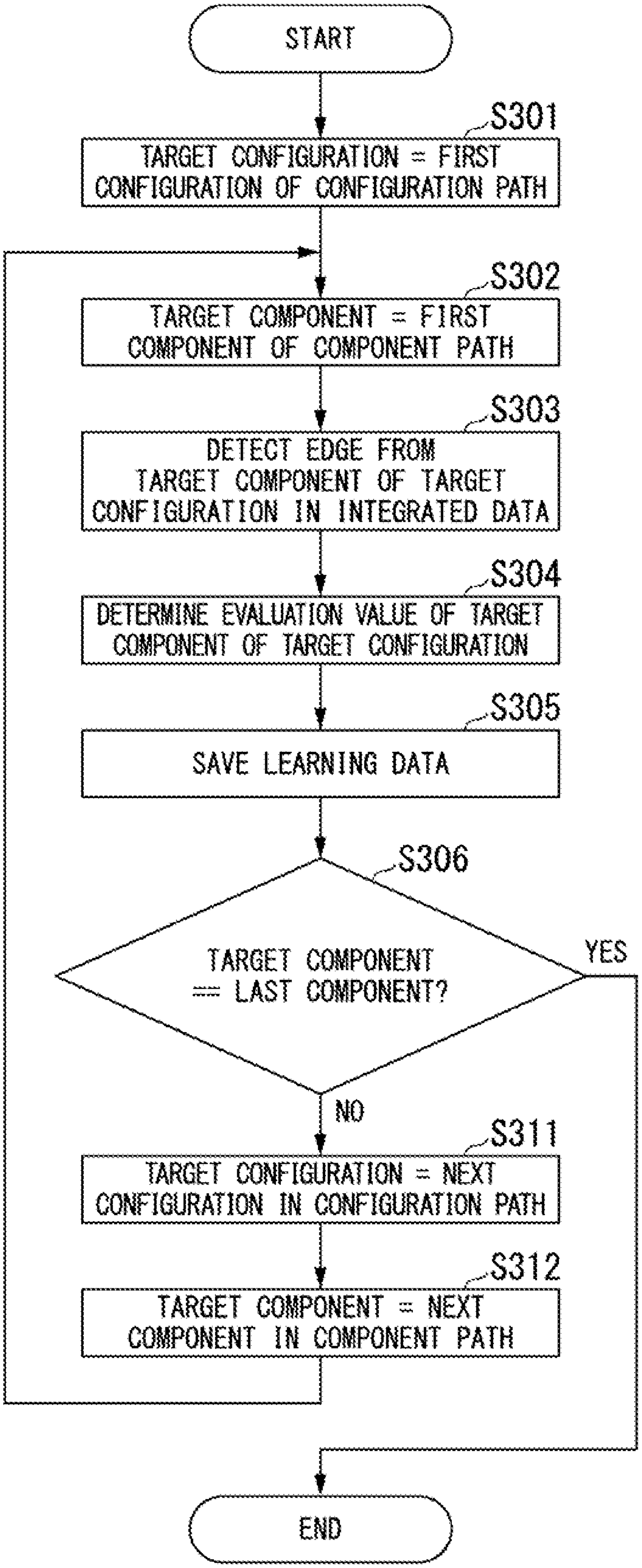
FIG. 11 is a flowchart showing an example of a processing procedure in which the system design learning device according to the first example embodiment generates learning data.

FIG. 11 is a flowchart showing an example of a processing procedure in which the system design learning device 100 generates learning data. The system design learning device 100 performs the process of FIG. 11 in step S24 of FIG. 8.

In FIG. 11, the "target configuration" variable is used as a variable whose value is a pointer indicating any system requirement in the configuration path. Also, in the process of FIG. 11, the "target component" variable is used as a variable whose value is a pointer indicating any component in the component path as a value. The system requirement shown as the value of the "target configuration" variable is referred to as a "target configuration." The component shown as the value of the "target component" variable is referred to as a "target component."

In the process of FIG. 11, the learning data generation portion 194 sets the first system requirement of the configuration path as the "target configuration" (step S301). That is, the learning data generation portion 194 sets the value of the "target configuration" variable so that the value of the "target configuration" variable indicates the first system requirement of the configuration path.

Next, the learning data generation portion 194 sets a first component in the component path as the "target component" (step S302). That is, the learning data generation portion 194 sets the value of the "target component" variable so that the value of the "target component" variable indicates the first component in the component path.

The learning data generation portion 194 lists all directed edges grouped in the "target component" among directed edges starting from the node representing the "target configuration" in the integrated data (step S303).

The learning data generation portion 194 sets a maximum value among the evaluation values recorded on finish point nodes of directed edges listed in step S303 as the evaluation value of the "target component" (step S304).

Also, the learning data generation portion 194 generates a set of a "target configuration," a "target component," and an evaluation value of the "target component" determined in step S304 as learning data and causes the storage portion 180 to store the generated learning data (step S305).

Also, the learning data generation portion 194 determines whether or not the "target component" is the last component in the component path (step S306). That is, the learning data generation portion 194 determines whether or not the value of the "target component" variable indicates the last component in the component path.

When it is determined that the "target component" is not the last component in the component path (step S306: NO), the learning data generation portion 194 selects a component immediately after the "target component" on the component path as the "target component" (step S311). That is, the learning data generation portion 194 updates the value of the "target component" variable so that the component immediately after the "target component" is indicated on the component path.

Also, the learning data generation portion 194 sets the system requirement immediately after the "target configuration" on the configuration path as the "target configuration" (step S312). That is, the learning data generation portion 194 updates the value of the "target configuration" variable so that the system requirement immediately after the "target configuration" is indicated on the configuration path.

After step S312, the process transitions to step S303.

On the other hand, when it is determined that the "target component" is the last component in the component path in step S306 (step S306: NO), the system design learning device 100 ends the process of FIG. 11. In this case, the process transitions to step S25 of FIG. 8.

Also, when the component path is empty at the start of step S24 in FIG. 8, the system design learning device 100 omits the processing of step S24. In this case, the system design learning device 100 does not perform the process of FIG. 11.

In step S25 of FIG. 8, the learning portion 195 performs learning of the component evaluation model using a plurality sets of the learning data generated by the learning data generation portion 194.

In this learning, when the system requirement shown in the learning data has been input to the component evaluation model, the learning portion 195 updates a parameter value of the component evaluation model so that an evaluation value output by the component evaluation model with respect to the component shown in the learning data is close to an evaluation value of the component shown in the learning data.

Figure 12:
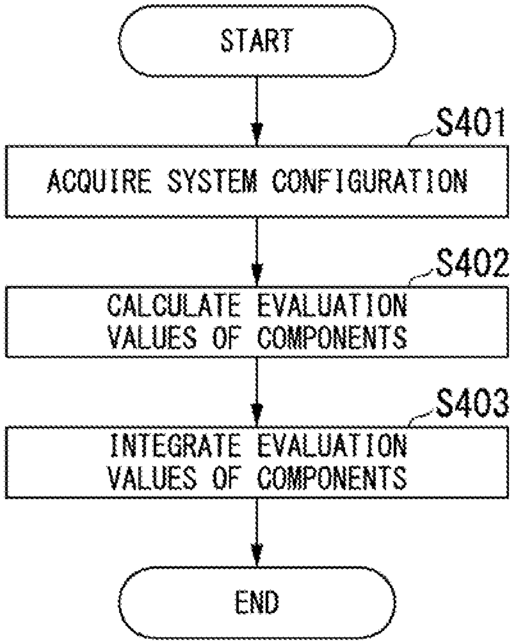
FIG. 12 is a flowchart showing an example of a processing procedure in which the system design learning device according to the first example embodiment calculates an evaluation value of a system configuration.

FIG. 12 is a flowchart showing an example of a processing procedure in which the system design learning device 100 calculates the evaluation value of the system requirement.

In the process of FIG. 12, the rule application evaluation portion 193 acquires the evaluation target system requirement (step S401).

The rule application evaluation portion 193 calculates an evaluation value of each component included in the evaluation target system using the component evaluation model learned in step S25 of FIG. 8 (step S402).

Specifically, the rule application evaluation portion 193 inputs an evaluation target system requirement to the component evaluation model and acquires the evaluation value of each component output by the component evaluation model.

Then, the rule application evaluation portion 193 integrates the evaluation values of the components and calculates an evaluation value of the entire system requirement (step S403). A method of integrating the evaluation values of the components in the rule application evaluation portion 193 is not limited to a specific method. For example, the rule application evaluation portion 193 may be configured to calculate a maximum value, a minimum value, or an average value of the evaluation values of the components as an integrated value of the evaluation values of the components and an example embodiment of the present invention is not limited thereto.

After step S403, the system design learning device 100 ends the process of FIG. 12.

As described above, the conversion rule application portion 191 performs the system design in which application of a conversion rule to a component of a design target system is iterated until a design result of the system design is obtained with respect to the design target system whose system requirement is shown. The design evaluation portion 192 determines an evaluation value for the system design on the basis of the design result. The rule application evaluation portion 193 determines an evaluation value related to conversion of an individual component in the system design on the basis of the evaluation value for the system design. The learning portion 195 learns about selection of the component to which the conversion rule is applied on the basis of learning data including the evaluation value related to the conversion of the component.

Here, it is considered that there is a case in which a system configuration serving as a target during system design is different from a system configuration serving as a target during learning as scales and configurations of the system vary in general in a method of learning a system design model for outputting a series of conversion rules to be applied in response to an input of a system requirement. Thereby, it is considered that there is a case in which the system requirement given during the system design is different from the system requirement given as learning data and a series of conversion rules to be applied cannot be appropriately determined. As described above, it is considered that there is a case in which valid learning is not performed in the method of learning a system design model for outputting a series of conversion rules to be applied in response to an input of a system requirement.

On the other hand, even if a system configuration for use in a field targeted by the system design learning device 100 differs according to each system, common components or similar components are expected to be used. When the system design learning device 100 learns about conversion in units of components, components identical or similar to the components that are used in the target system during the system design are also expected to be used in the target system during the learning. In this respect, the system design learning device 100 learns about conversion in units of components, so that valid learning can be performed even if a system configuration serving as a target during system design is different from a system configuration serving as a target during learning.

Also, the rule application evaluation portion 193 determines the evaluation value related to the conversion of each component of the system requirement on the basis of data in which a plurality of histories of the system design are integrated for the same system requirement.

Thereby, the system design learning device 100 can learn about the selection of the component to which the conversion rule is applied using learning data obtained by aggregating results of a plurality of system designs. In this respect, according to the system design learning device 100, learning is expected to be performed with high accuracy.

Also, the above-described system design result indicates either that the system design has succeeded or that the system design has failed.

Thereby, the learning data generation portion 194 is expected to generate learning data in which evaluation is high when there is a conversion sequence in which the system design succeeds and the learning portion 195 is expected to perform learning so that a possibility of success in the system design is high.

However, as described above, the system design result is not limited to a system design result indicating either the success of the system design or the failure of the system design.

For example, the system design result may indicate that the system design has succeeded, that the system design has failed, or that the success or failure of the system design is undetermined. In this case, the design evaluation portion 192 may be configured to determine an evaluation value indicating higher evaluation as the evaluation value for the system design in the order of a case in which the system design has succeeded, a case in which the success or failure of the system design is undetermined, and a case in which the system design has failed.

Also, the fact that the system design has succeeded includes the fact that a system requirement concretized at a level where a system is able to be deployed has been obtained.

Thereby, the learning data generation portion 194 is expected to generate learning data in which evaluation is high when there is a conversion sequence capable of being concretized at a level where the system is able to be deployed and the learning portion 195 is expected to perform learning so that a possibility of concretization at a level where the system is able to be deployed is high.

Also, the fact that the system design has failed includes the fact that it is determined that a system requirement concretized at a level where a system is able to be deployed has not been obtained.

Thereby, the learning data generation portion 194 is expected to generate learning data in which evaluation is low when there is no conversion sequence capable of being concretized at a level where the system is able to be deployed and the learning portion 195 is expected to perform learning so that a possibility of concretization at a level where the system is able to be deployed is high.

Also, when the design result indicates that the system design has succeeded, the design evaluation portion 192 determines the evaluation value for the system design based on the obtained system evaluation index value.

Thereby, the system design learning device 100 can perform learning using not only the result of success or failure of the system design but also more detailed learning data such as, for example, learning data reflecting obtained system performance evaluation. In this respect, according to the system design learning device 100, learning can be performed with high accuracy.

In this case, the fact that the system design has succeeded may include, but is not limited to, the fact that the system requirement concretized at the level where the system is able to be deployed has been obtained.

The fact that the system design has succeeded may be determined to be a part of an event for obtaining a system requirement concretized at a level where the system is able to be deployed. For example, the fact that the system design has succeeded may be the fact that the system requirement concretized at a level where the system is able to be deployed is obtained and a prescribed condition related to an installation space is satisfied.

Thereby, the learning portion 195 can perform learning so that it is possible to cope with another condition in addition to a condition for concretizing the system.

Second Example Embodiment

Figure 13:
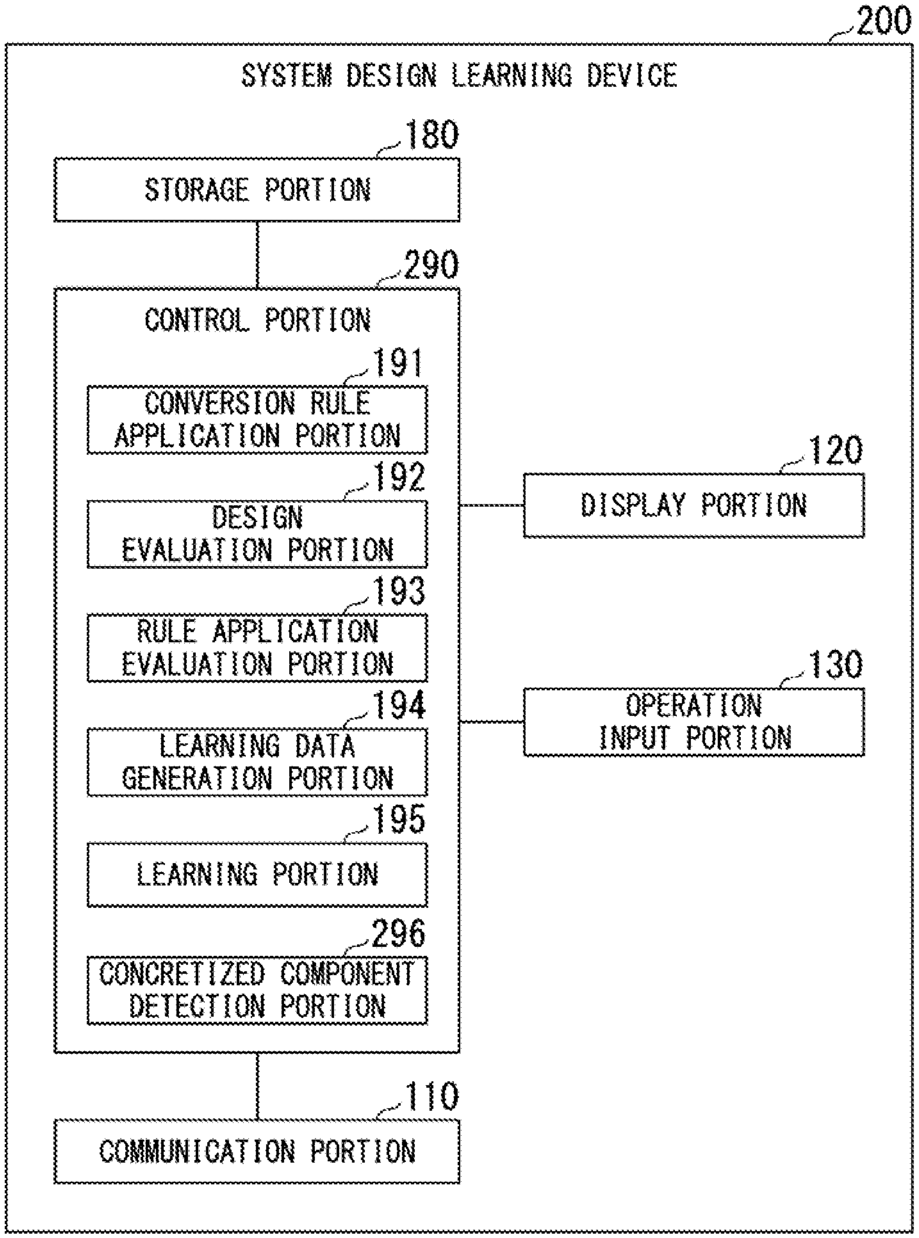
FIG. 13 is a schematic block diagram showing a functional configuration of the system design learning device according to a second example embodiment.

FIG. 13 is a schematic block diagram showing a functional configuration of a system design learning device according to a second example embodiment. According to the configuration shown in FIG. 13, a system design learning device 200 includes a communication portion 110, a display portion 120, an operation input portion 130, a storage portion 180, and a control portion 290. The control portion 290 includes a conversion rule application portion 191, a design evaluation portion 192, a rule application evaluation portion 193, a learning data generation portion 194, a learning portion 195, and a concretized component detection portion 296.

Parts having similar functions in correspondence with the parts of FIG. 1 among parts of FIG. 13 are denoted by the same reference numerals (110, 120, 130, 180, and 191 to 195) and detailed description thereof will be omitted here.

The system design learning device 200 is different from the system design learning device 100 in that the control portion 290 further includes a concretized component detection portion 296 in addition to the parts provided in the control portion 190. Also, in the system design learning device 200, the process performed by the conversion rule application portion 191 is concretized to a process using concretized component information generated by the concretized component detection portion 296.

In other respects, the system design learning device 200 is similar to the system design learning device 100 and the control portion 290 is similar to the control portion 190. The system design learning device 200 corresponds to an example of the system design learning device 100.

The concretized component detection portion 296 generates concretized component information indicating a component concretized by the conversion rule for each conversion rule capable of being used in system design by the conversion rule application portion 191. The concretized component detection portion 296 corresponds to an example of a concretized component detection means.

Conversion rules capable of being used by the conversion rule application portion 191 for the system design may be all conversion rules provided in advance. For example, the conversion rules capable of being used in the system design by the conversion rule application portion 191 may be all conversion rules stored in the storage portion 180.

Alternatively, some of the conversion rules provided in advance may be conversion rules capable of being used in the system design by the conversion rule application portion 191. For example, the storage portion 180 may be configured to store conversion rules capable of being used to design a type of system for each type of system.

Alternatively, in a case in which the conversion rule is incorporated in a circuit and implemented in hardware or the like, the conversion rule capable of being used in the system design by the conversion rule application portion 191 may be implemented in a method other than a method in which the storage portion 180 stores the conversion rule.

The component concretized by the conversion rule can be detected as a component that is included in the system requirement before the conversion rule is applied and is not included in the system requirement after the conversion rule is applied. For example, in the conversion rule for converting the system requirement shown in FIG. 3 into the system requirement shown in FIG. 4, a communication means represented by an edge E201 of FIG. 3 corresponds to an example of a component that is included in the system requirement before the conversion rule is applied and is not included in the system requirement before the conversion rule is applied. In this conversion rule, the communication means represented by the edge E201 is concretized to a communication means represented by an edge E211 of FIG. 4.

The storage portion 180 stores the conversion rule including the system requirement before the application of the conversion rule exemplified in FIG. 3 and the system requirement after the application of the conversion rule exemplified in FIG. 3. The above conversion rule can be expressed by an expression in which the system requirement before the application of the conversion rule is on the left side and the system requirement after the application of the conversion rule is on the right side. Hereinafter, the system requirement before the application of the conversion rule is referred to as the left side of the conversion rule or is also simply referred to as the left side. The system requirement after the application of the conversion rule is referred to as the right side of the conversion rule or is also simply referred to as the right side.

As described above, when the conversion rule is expressed using the system requirement before the application of the conversion rule and the system requirement after the application of the conversion rule, a method of actually attempting to apply the conversion rule is considered as one method of detecting a conversion rule applicable to a conversion target system requirement. Attempting to apply the conversion rule to the system requirement mentioned here is performing a process of applying the conversion rule to the system requirement regardless of whether or not the conversion is actually performed.

When an attempt is made to apply a conversion rule to the conversion target system requirement and the component is concretized, it can be determined that the conversion rule is applicable to the conversion target system. On the other hand, if the component has not been concretized, it can be determined that the conversion rule cannot be applied to the conversion target system.

For example, the conversion rule application portion 191 according to the first example embodiment may be configured to detect conversion rule candidates using the above method in step S111 of FIG. 9 and select any one of the detected candidates as a conversion rule to be applied to the conversion target system requirement.

In this case, the conversion rule application portion 191 attempts to apply each of the conversion rules capable of being used in the system design to the system requirement of the conversion target shown as the "current configuration." The conversion rule application portion 191 compares the system requirement before an attempt is made to apply the conversion rule with the system requirement after an attempt is made to apply the conversion rule and determines the presence or absence of the concretized component.

When it is determined that there is a concretized component, the conversion rule application portion 191 can determine that the conversion rule is applicable to the "current configuration." On the other hand, when it is determined that there is no concretized component, the conversion rule application portion 191 can determine that the conversion rule cannot be applied to the "current configuration."

The conversion rule application portion 191 selects any one of the candidates as a conversion rule to be applied to the conversion target system requirement using the conversion rule determined to be applicable to the "current configuration" as a candidate.

However, the method in which the conversion rule application portion 191 according to the first example embodiment selects the conversion rule to be applied to the conversion target system requirement is not limited to a specific method.

A process of detecting a conversion rule applicable to a conversion target system requirement among conversion rules capable of being used in the system design is not limited to the system design learning device 100 and is a generally required process in a device that performs system design in which the component concretization is iterated by applying the conversion rule to the system requirement.

In a method of detecting a conversion rule applicable to a conversion target system requirement by attempting to apply the conversion rule to the conversion target system requirement, it is necessary to attempt to apply all conversion rules capable of being used in the system design to the conversion target system requirement. In this respect, the calculation cost is high in the above method. In particular, in the above method, when the number of conversion rules capable of being used in the system design is larger and when the number of times the conversion rule is applied to the system requirement is larger, the calculation cost becomes higher.

As described above, when the conversion rule is expressed using the system requirement before the application of the conversion rule and the system requirement after the application of the conversion rule, a method of determining whether or not a conversion target system requirement includes a system requirement shown as the left side of the conversion rule is considered as another method of detecting a conversion rule applicable to a conversion target system requirement. Specifically, it is considered a case in which it is determined whether or not some of the conversion target system requirement matches the system requirement shown as the left side of the conversion rule, for example, by performing pattern matching on various parts of the conversion target system requirement.

Both the method of actually attempting to apply the conversion rule and the method of determining whether or not a conversion target system requirement includes a system requirement shown as the left side of the conversion rule lead to a non-deterministic polynomial (NP)-complete problem called a subgraph isomorphism problem. In this respect, the calculation cost is high. In particular, the calculation cost becomes higher in all of the above methods when the number of conversion rules capable of being used in the system design increases, the scale of the conversion target system requirement increases, and the number of times the conversion rule is applied to the system requirement increases.

The calculation cost for detecting the conversion rule applicable to the conversion target system requirement increases and hence the time period required for the system design increases.

Therefore, the concretized component detection portion 296 generates concretized component information for each of the conversion rules capable of being used in the system design in advance by the conversion rule application portion 191 and associates the conversion rule and the concretized component information representing the component concretized by the conversion rule. The term "in advance" mentioned here may indicate a timing before the conversion rule application portion 191 performs the system design process. For example, the term "in advance" mentioned here may indicate a previous timing before the conversion rule application portion 191 performs the processing of step S21 of FIG. 8.

A method of associating the conversion rule with the concretized component information in the concretized component detection portion 296 is not limited to a specific method.

For example, the storage portion 180 may be configured to store one conversion rule per row in the form of a data table having items of the left side, the right side, and the concretized component information. The concretized component detection portion 296 may be configured to write concretized component information generated for each conversion rule to a field of the concretized component information of a row where the conversion rule is stored.

Alternatively, the storage portion 180 may be configured to store the conversion rule and the concretized component information as separate information. The concretized component detection portion 296 may be configured to associate the conversion rule with the concretized component information by linking one conversion rule and the concretized component information indicating the component concretized by the conversion rule.

The concretized component detection portion 296 compares the left side and the right side with respect to each conversion rule and detects a component that exists on the left side and does not exist on the right side. The concretized component detection portion 296 determines that the detected component is a component that is concretized by the conversion rule and generates concretized component information indicating that the component is concretized by the conversion rule. As described above, the concretized component detection portion 296 may be configured to cause the storage portion 180 to store the concretized component information.

The concretized component detection portion 296 generates the concretized component information in advance, so that the conversion rule application portion 191 can narrow down the number of candidates for a conversion rule to be applied to the conversion target system requirement among conversion rules capable of being used for the system design with reference to the concretized component information.

Specifically, the conversion rule application portion 191 determines whether or not a component shown in the concretized component information is included in the conversion target system requirement. When it is determined that the component shown in the concretized component information is included in the conversion target system requirement, the conversion rule application portion 191 includes a conversion rule associated with the concretized component information in candidates for a conversion rule to be applied to the conversion target system requirement. On the other hand, when it is determined that the component shown in the concretized component information is not included in the conversion target system requirement, the conversion rule application portion 191 does not include a conversion rule associated with the concretized component information in candidates for a conversion rule to be applied to the conversion target system requirement.

In this case, the candidates for the conversion rule to be applied to the conversion target system requirement satisfy a necessary condition for enabling the application to the conversion target system requirement. When the left side of the conversion rule includes another component in addition to the component to be concretized, it is considered a case in which a relationship between the component to be concretized and the other component is indicated. When the conversion target system requirement satisfies a relationship between the component to be concretized and the other component in addition to the inclusion of the component to be concretized, the candidate for the conversion rule to be applied to the conversion target system requirement is applicable to the conversion target system.

In general, a case in which candidates for the conversion rule to be applied to the conversion target system requirement often include a conversion rule that does not satisfy a relationship between a component to be concretized and another component and cannot be applied is considered.

On the other hand, if the system requirement is properly given and learning of the component evaluation model is properly performed, at least one applicable conversion rule is expected to be included in the candidates for the conversion rule to be applied to the conversion target system requirement. In this case, the conversion rule application portion 191 detects a conversion rule applicable to the conversion target system requirement from among the conversion rule candidates that are applied to the conversion target system requirement. The calculation cost is expected to be low in that the number of candidates for the conversion rule serving as a determination target of whether or not the application to the system requirement is possible is narrowed down.

Alternatively, the conversion rule application portion 191 may be configured to directly select a conversion rule to be applied to the conversion target system requirement from the conversion rule candidates to be applied to the conversion target system requirement. Specifically, the conversion rule application portion 191 may be configured to determine whether or not a candidate is applicable to the conversion target system requirement by attempting to apply any one of the candidates for the conversion rule to be applied to the conversion target system requirement to the conversion target system requirement. In this case, the calculation cost of a process of selecting the conversion rule to be applied to the conversion target system requirement is expected to be low because the number of candidates for the conversion rule to be applied to the conversion target system requirement is narrowed down.

Also, the concretized component information generated by the concretized component detection portion 296 can be used for detecting candidates for conversion rules to be applied to system requirements with respect to various system requirements. Therefore, it is only necessary for the concretized component detection portion 296 to generate the concretized component information before the conversion rule application portion 191 performs the system design and the conversion rule application portion 191 does not have to generate concretized component information every time the conversion rule is applied to the system requirement. In this respect, the increase in the calculation cost is expected to be small even if the conversion rule application portion 191 applies the conversion rule to the system requirement many times.

Figure 14:
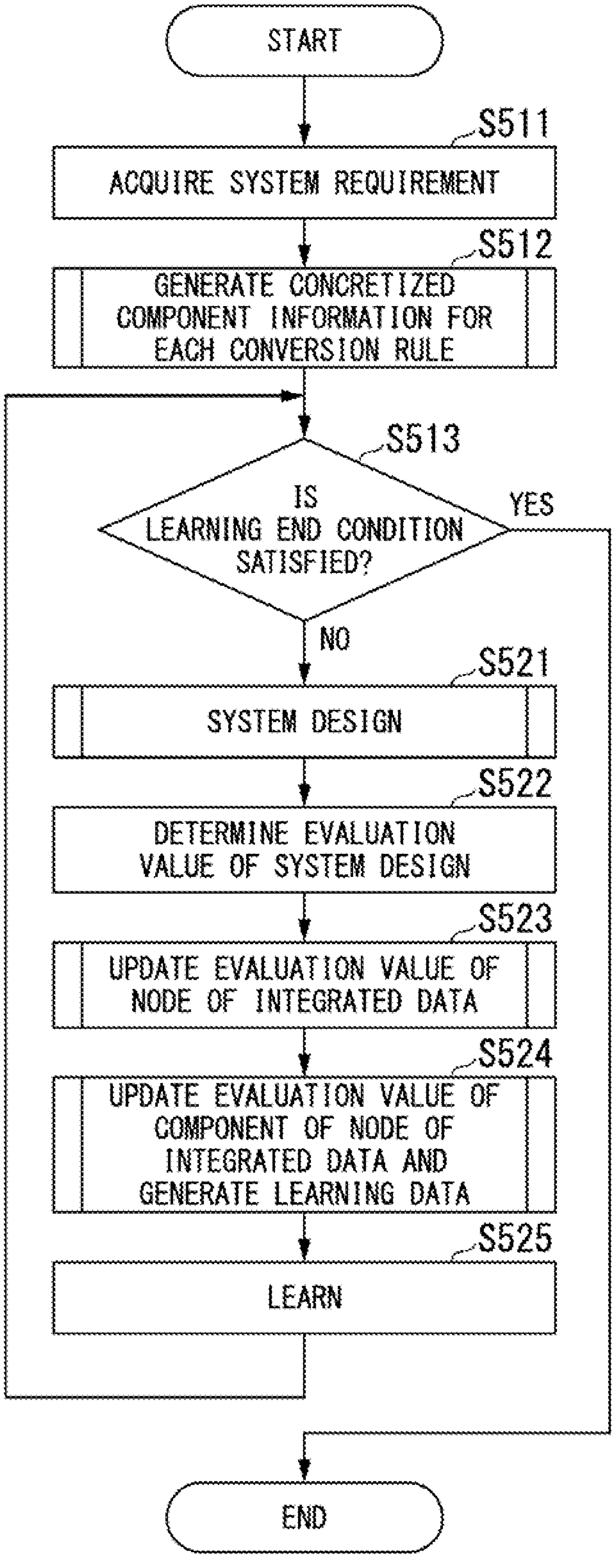
FIG. 14 is a flowchart showing an example of a processing procedure in which the system design learning device according to the second example embodiment generates learning data and performs learning.

FIG. 14 is a flowchart showing an example of a processing procedure in which the system design learning device 200 generates learning data and performs learning. The system design learning device 200 may be configured to perform the process of FIG. 14 instead of the process of FIG. 8.

In the process of FIG. 14, the system design learning device 200 acquires a learning target system requirement (step S511). The system design learning device 200 may be configured to use a system requirement given as a design target system requirement as the learning target system requirement. Alternatively, the system design learning device 200 may be configured to acquire the learning target system requirement separately from the design target system requirement.

Next, the concretized component detection portion 296 detects a component concretized by the conversion rule for each of the conversion rules that the conversion rule application portion 191 can use in the system design and generates the concretized component information (step S512). As described above, the concretized component detection portion 296 may be configured to cause the storage portion 180 to store the concretized component information.

Subsequently, the control portion 290 determines whether or not a learning end condition is satisfied (step S513). The learning end condition may be based on, but is not limited to, a learning time period, the number of learning processes (the number of times the loop of steps S513 to S525 is iterated), a magnitude of a learning error, and the like.

When the control portion 290 determines that the end condition is satisfied (step S513: YES), the system design learning device 200 ends the process of FIG. 14.

On the other hand, when the control portion 290 determines that the end condition is not satisfied (step S513: NO), the process proceeds to step S521.

The processing of steps S521 to S525 is similar to the processing of steps S21 to S25 of FIG. 8, except that the conversion rule application portion 191 performs the system design using the concretized component information in step S521.

The processing of step S521 of FIG. 14 corresponds to an example of the processing of step S21 of FIG. 8. For example, when the system design learning device 200 performs the process of FIG. 9 in step S521 of FIG. 14, the conversion rule application portion 191 refers to the concretized component information in the processing of step S111. Specifically, in the processing of step S111, the conversion rule application portion 191 may be configured to select one conversion rule to be applied to the selected component from the conversion rules associated with the concretized component information indicating the component.

After step S525, the process returns to step S513.

In the above-described processing of step S111, the conversion rule application portion 191 may be configured to use the component evaluation model when one component to be concretized is selected from the “current configuration.” For example, the conversion rule application portion 191 may be configured to input the system requirement shown as the “current configuration” to the component evaluation model and acquire evaluation for each component of the “current configuration.” The conversion rule application portion 191 may be configured to perform selection of a component to be concretized on the basis of the evaluation of each component that has been obtained such as selection of a component having highest evaluation as the component to be concretized.

As described above, the component evaluation model outputs high evaluation when there is a conversion sequence in which the system design succeeds with respect to learning of the learning portion 195. A possibility of success of the system design is expected to increase by selecting a component that is highly evaluated by the component evaluation model in the conversion rule application portion 191.

In the processing of step S111 described above, the conversion rule application portion 191 may be configured to use the component evaluation model when the conversion rule to be applied to the selected component is selected from the conversion rule candidates.

For example, the conversion rule application portion 191 may be configured to apply each of the conversion rule candidates to the system requirement shown as the “current configuration” and acquire the system requirement after the application of the conversion rule for each conversion rule candidate. The conversion rule application portion 191 may be configured to input each of the system requirements after the application of the conversion rule to the component evaluation model and acquire evaluation for the system requirement after the application of the conversion rule for each conversion rule candidate.

As described above, the component evaluation model outputs the evaluation for each component shown in the system requirement in response to the input of the system requirement. Therefore, the conversion rule application portion 191 calculates the evaluation for the entire system requirement on the basis of the evaluation for each component. For example, as described above for the system design learning device 100, the conversion rule application portion 191 may be configured to calculate a maximum value of the evaluation value for each component as the evaluation value for the entire system requirement.

The conversion rule application portion 191 may be configured to perform the selection of any one of the conversion rule candidates as the conversion rule to be applied to the selected component on the basis of the evaluation for the system requirement after the application of the conversion rule such as the selection of a conversion rule candidate associated with highest evaluation for the system requirement after the application of the conversion rule.

The possibility of success of the system design is expected to increase because the conversion rule application portion 191 calculates the evaluation for the system requirement after the application of the conversion rule using the component evaluation model and selects a conversion rule associated with high evaluation of the system requirement after the application of the conversion rule.

Figure 15:
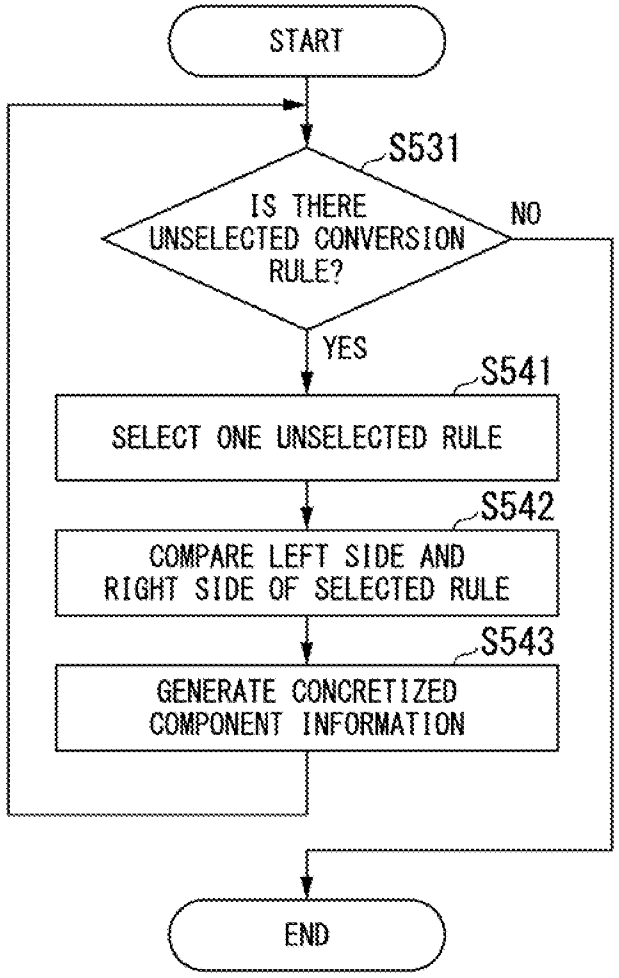
FIG. 15 is a flowchart showing an example of a processing procedure for calculating a component to be concretized by a concretized component detection portion according to the second example embodiment.

FIG. 15 is a flowchart showing an example of a processing procedure in which the concretized component detection portion 296 performs calculation of a component to be concretized. The concretized component detection portion 296 performs the process of FIG. 15 in step S512 of FIG. 14.

In the process of FIG. 15, the concretized component detection portion 296 confirms whether there is an unselected conversion rule in step S541 (step S531). When the processing of step S541 has not been performed at all, the concretized component detection portion 296 may be configured to determine that all the conversion rules capable of being used in the system design have not been selected.

When it is determined that there is no unselected conversion rule (step S531: NO), the concretized component detection portion 296 ends the process of FIG. 15.

On the other hand, when it is determined that there is an unselected conversion rule in step S531 (step S531: YES), the concretized component detection portion 296 selects one of the unselected conversion rules (step S541).

In the following description, the conversion rule selected by the concretized component detection portion 296 in executing the latest step S541 while iteratively executing step S541 is also referred to as a target conversion rule.

Subsequently, the concretized component detection portion 296 compares the left side and the right side of the target conversion rule (step S542).

Subsequently, the concretized component detection portion 296 detects a component that is present on the left side of the target conversion rule but is not present on the right side, and generates concretized component information indicating the detected component as a component that is concretized by the target conversion rule (step S543). As described above, the concretized component detection portion 296 associates the conversion rule with the concretized component information indicating the component concretized by the conversion rule. The concretized component detection portion 296 may be configured to cause the storage portion 180 to store the concretized component information.

After step S543, the process transitions to step S531.

The concretized component information indicates the component concretized by the conversion rule for each conversion rule. The system design learning device 200 does not have to detect components concretized by the conversion rules one by one every time the conversion rule is applied to the system requirement by referring to the concretized component information at both the time of learning and the time of designing. In this respect, according to the system design learning device 200, both the calculation cost incurred in the learning process and the calculation cost incurred in the design process can be improved.

As one method of selecting the next state in which the conversion rule has been applied to the system requirement, a method of attempting to apply all the conversion rules capable of being used for the system design to the conversion target system requirement is considered. In the above method, for example, for each conversion rule, an evaluation value for the system requirement after an attempt made to apply the conversion rule is calculated and the system requirement of the next state is selected on the basis of the calculated evaluation value.

However, the calculation cost of the above method is high in that it is necessary to attempt to apply all conversion rules.

On the other hand, in the system design learning device 200, the conversion rule application portion 191 can select a component that is concretized on the basis of the evaluation of each component obtained using the component evaluation model when the next state in which the conversion rule is applied to the system requirement is selected at both the time of learning and the time of designing. The conversion rule application portion 191 can attempt to apply only the conversion rule for concretizing the selected component with respect to the system requirement of the current state and select the system requirement of the next state from any of the next state candidates derived as a result.

According to the system design learning device 200, the conversion rule whose application is attempted is only a conversion rule for concretizing the selected component. In this respect, the calculation cost is lower than that of the above-described method. In this respect, according to the system design learning device 200, both a time period required for learning and a time period required for designing are expected to be shortened.

In the second example embodiment, various methods can be taken into account as a method in which the conversion rule application portion 191 selects the next state from among the next state candidates. For example, the conversion rule application portion 191 may be configured to select the next state on the basis of the evaluation value of the system requirement obtained using the evaluation method shown in FIG. 12. At this time, the conversion rule application portion 191 may be configured to select a system requirement having a maximum evaluation value as the next state or may be configured to select another system requirement. Alternatively, the conversion rule application portion 191 may be configured to select the next state randomly without using the evaluation method shown in FIG. 12.

As described above, the concretized component detection portion 296 generates concretized component information indicating the component concretized by the conversion rule for each conversion rule capable of being used in the system design by the conversion rule application portion 191. The conversion rule application portion 191 determines a conversion rule for use in the system design on the basis of the concretized component information.

The conversion rule application portion 191 does not have to obtain a conversion rule capable of being applied to the system requirement for each determination of the conversion rule as it determines the conversion rule for use in the system design on the basis of the concretized component information. In this respect, according to the system design learning device 200, both a time period required for learning and a time period required for designing are expected to be shortened.

Also, the learning portion 195 learns a component evaluation model for outputting evaluation for each component shown in the system requirement in response to an input of the system requirement. The conversion rule application portion 191 selects a component to which the conversion rule is applied on the basis of the evaluation of the component evaluation model for each component shown in the system requirement, selects one conversion rule among conversion rule candidates for a conversion rule shown to be applicable to the selected component represented by the concretized component information, and applies the selected conversion rule to the selected component.

A possibility of success of the system design is expected to increase because the conversion rule application portion

191 selects the component on the basis of the evaluation by the component evaluation model.

Also, the conversion rule application portion 191 selects one conversion rule as the conversion rule to be applied to the selected component from among the conversion rule candidates on the basis of the evaluation of the component evaluation model for the system requirement after the application of the conversion rule obtained by applying each conversion rule candidate to the system requirement.

A possibility of success of the system design is expected to increase because the conversion rule application portion 191 selects the conversion rule on the basis of the evaluation for the system requirement after the application of the conversion rule obtained using the component evaluation model.

Third Example Embodiment

Figure 16:
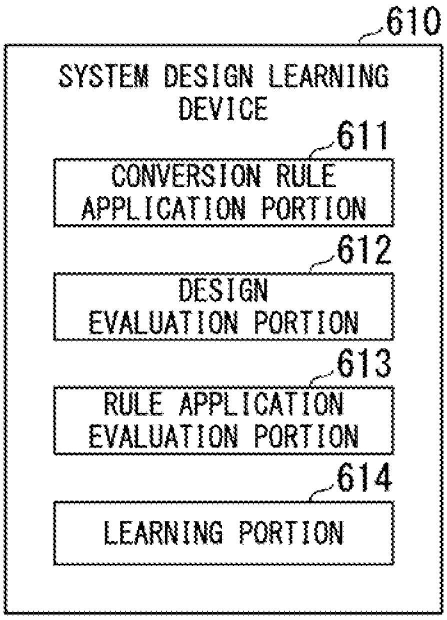
FIG. 16 is a diagram showing an example of a configuration of a system design learning device according to a third example embodiment.

FIG. 16 is a diagram showing an example of a configuration of the system design learning device according to a third example embodiment. A system design learning device 610 shown in FIG. 16 includes a conversion rule application portion 611, a design evaluation portion 612, a rule application evaluation portion 613, and a learning portion 614.

According to the above configuration, the conversion rule application portion 611 performs system design in which application of a conversion rule to a component of a design target system is iterated until a design result of the system design is obtained with respect to the design target system whose system requirement is shown. The design evaluation portion 612 determines an evaluation value for the system design on the basis of the design result. The rule application evaluation portion 613 determines an evaluation value related to conversion of an individual component in the system design on the basis of the evaluation value for the system design. The learning portion 614 learns about selection of the component to which the conversion rule is applied on the basis of learning data including the evaluation value related to the conversion of the component.

The conversion rule application portion 611 corresponds to an example of a conversion rule application means. The design evaluation portion 612 corresponds to an example of a design evaluation means. The rule application evaluation portion 613 corresponds to an example of a rule application evaluation means. The learning portion 614 corresponds to an example of a learning means.

As described above, it is considered that there is a case in which valid learning is not performed as scales and configurations of the system vary in general in a method of learning a system design model for outputting a series of conversion rules to be applied in response to an input of a system requirement.

On the other hand, even if a system configuration for use in a field targeted by the system design learning device 610 differs according to each system, common components or similar components are expected to be used. When the system design learning device 610 learns about conversion in units of components, components identical or similar to the components that are used in the target system during the system design are also expected to be used in the target system during the learning. In this respect, the system design learning device 610 learns about conversion in units of components, so that valid learning can be performed even if a system configuration serving as a target during system design is different from a system configuration serving as a target during learning.

Fourth Example Embodiment

Figure 17:
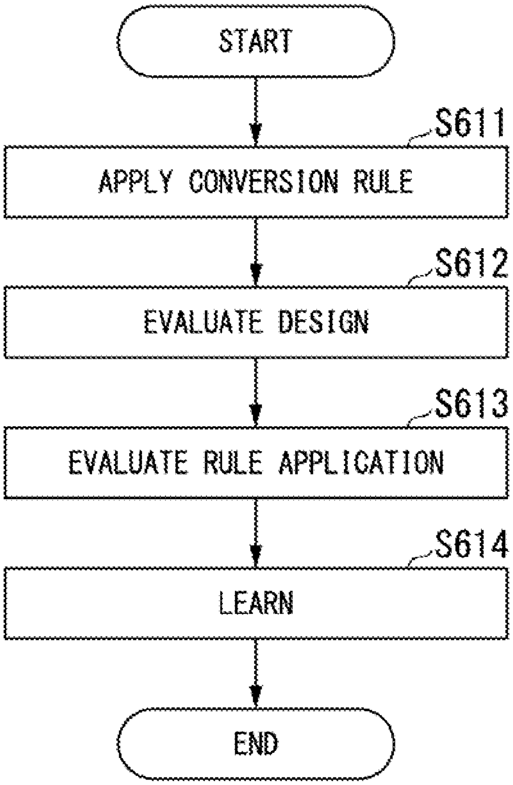
FIG. 17 is a flowchart showing an example of a processing procedure in a system design learning method according to a fourth example embodiment.

FIG. 17 is a flowchart showing an example of a processing procedure in a system design learning method according to a fourth example embodiment.

The processes shown in FIG. 17 include applying a conversion rule (step S611), evaluating design (step S612), evaluating rule application (step S613), and performing learning (step S614).

In applying the conversion rule (step S611), system design in which application of a conversion rule to a component of a design target system is iterated is performed until a design result of the system design is obtained with respect to the design target system whose system requirement is shown. In evaluating the design (step S612), an evaluation value for the system design is determined on the basis of the design result. In evaluating the rule application (step S613), an evaluation value related to conversion of an individual component in the system design is determined on the basis of the evaluation value for the system design. In performing the learning (step S614), learning about selection of the component to which the conversion rule is applied is performed on the basis of learning data including the evaluation value related to the conversion of the component.

As described above, it is considered that there is a case in which valid learning is not performed as scales and configurations of the system vary in general in a method of learning a system design model for outputting a series of conversion rules to be applied in response to an input of a system requirement.

On the other hand, even if a system configuration for use in a field targeted by the process shown in FIG. 17 differs according to each system, common components or similar components are expected to be used. When learning about conversion in units of components is performed in the process shown in FIG. 17, components identical or similar to the components that are used in the target system during the system design are also expected to be used in the target system during the learning. In this respect, learning about conversion is performed in units of components in the process shown in FIG. 17, so that valid learning can be performed even if a system configuration serving as a target during system design is different from a system configuration serving as a target during learning.

Figure 18:
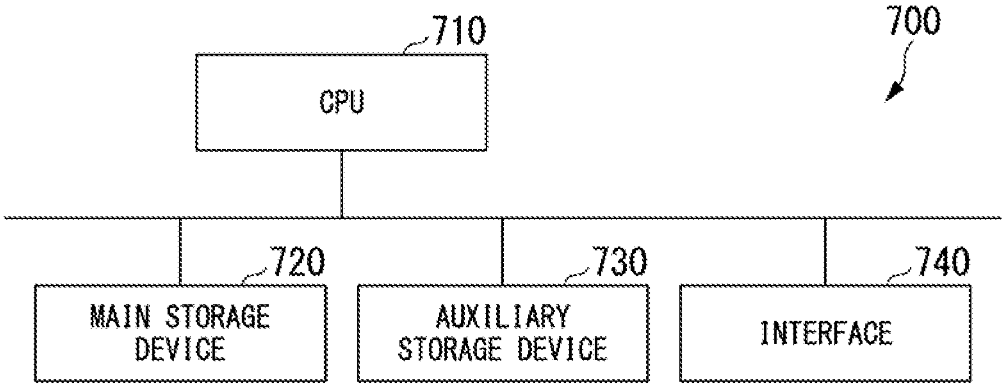
FIG. 18 is a schematic block diagram showing a configuration of a computer according to at least one example embodiment.

FIG. 18 is a schematic block diagram showing a configuration of a computer according to at least one example embodiment.

According to the configuration shown in FIG. 18, a computer 700 includes a CPU 710, a main storage device 720, an auxiliary storage device 730, and an interface 740.

Any one or more of the system design learning device 100, the system design learning device 200, and the system design learning device 610 may be mounted in the computer 700. In this case, the operation of each of the above-described processing portions is stored in the auxiliary storage device 730 in the form of a program. The CPU 710 reads the program from the auxiliary storage device 730, loads the program into the main storage device 720, and executes the above process in accordance with the program. Also, the CPU 710 secures a storage area corresponding to each of the above-described storage portions in the main storage device 720 in accordance with the program.

When the system design learning device 100 is mounted in the computer 700, operations of the control portion 190 and each portion thereof are stored in the auxiliary storage device 730 in the form of a program. The CPU 710 reads the program from the auxiliary storage device 730, loads the program into the main storage device 720, and executes the above process in accordance with the program.

Also, the CPU 710 secures a storage area corresponding to the storage portion 180 in the main storage device 720 in accordance with the program.

Communication by the communication portion 110 is executed by the interface 740 having a communication function and performing communication according to the control of the CPU 710.

A display process of the display portion 120 is executed by displaying various types of images in accordance with the control of the CPU 710 when the interface 740 includes a display screen. The reception of a user operation on the operation input portion 130 is executed by the interface 740 including an input device, receiving the user operation, and outputting a signal indicating the received user operation to the CPU 710.

When the system design learning device 200 is mounted in the computer 700, the operations of the control portion 290 and each portion thereof are stored in the auxiliary storage device 730 in the form of a program. The CPU 710 reads the program from the auxiliary storage device 730, loads the program into the main storage device 720, and executes the above process in accordance with the program.

Also, the CPU 710 secures a storage area corresponding to the storage portion 180 in the main storage device 720 in accordance with the program.

Communication by the communication portion 110 is executed by the interface 740 having a communication function and performing communication in accordance with the control of the CPU 710.

The display process of the display portion 120 is executed by displaying various types of images in accordance with the control of the CPU 710 when the interface 740 includes a display screen. The reception of the user operation by the operation input portion 130 is executed by the interface 740 including an input device, receiving the user operation, and outputting a signal indicating the received user operation to the CPU 710.

When the system design learning device 610 is mounted in the computer 700, operations of the conversion rule application portion 611, the design evaluation portion 612, the rule application evaluation portion 613, and the learning portion 614 are stored in the form of a program in the auxiliary storage device 730. The CPU 710 reads the program from the auxiliary storage device 730, loads the program into the main storage device 720, and executes the above process in accordance with the program.

A process of each part may be performed by recording a program for implementing all or some of the functions of the system design learning device 100, the system design learning device 200, and the system design learning device 610 on a computer-readable recording medium and causing a computer system to read and execute the program recorded on the recording medium. The "computer system" described here is assumed to include an operating system (OS) and hardware such as peripheral devices.

The "computer-readable recording medium" refers to a flexible disk, a magneto-optical disc, a read-only memory (ROM), a portable medium such as a compact disc (CD)-ROM, or a storage device such as a hard disk embedded in the computer system. Also, the above-described program may be a program for implementing some of the above-described functions. Further, the above-described program may be a program capable of implementing the above-described function in combination with a program already recorded on the computer system.

According to an example aspect of the present invention, valid learning is expected to be performed even if a system configuration serving as a target during system design is different from a system configuration serving as a target during learning.

Although example embodiments of the present invention have been described above with reference to the drawings, specific configurations are not limited to the example embodiments and changes in designs and the like may also be included without departing from the scope of the present invention.

What is claimed is:

1. A system design learning device comprising:

at least one memory configured to store instructions; and at least one processor configured to execute the instructions to:

perform, with respect to a design target system whose system requirement is shown, system design in which application of a conversion rule to a component of the design target system is iterated until a design result of the system design is obtained;

determine an evaluation value for the system design based on the design result;

determine an evaluation value related to conversion of each component in the system design based on the evaluation value for the system design; and perform learning about selection of a component to which the conversion rule is applied based on learning data including the evaluation value related to the conversion of each component, wherein the learning comprises performing learning of a component evaluation model using the learning data, the component evaluation model being a model that, in response to an input of the system requirement, outputs an evaluation value of each component shown in the system requirement, and wherein the performing learning of the component evaluation model comprises updating a parameter value of the component evaluation model so that an evaluation value output by the component evaluation model is close to the evaluation value included in the learning data.

2. The system design learning device according to claim 1, wherein the at least one processor is configured to execute the instructions to determine the evaluation value related to the conversion of each component of the system requirement based on data in which a plurality of histories of the system design with respect to the same system requirement are integrated.

3. The system design learning device according to claim 1, wherein the design result indicates that the system design has succeeded or that the system design has failed.

4. The system design learning device according to claim 3, wherein a fact that the system design has succeeded includes a fact that a system requirement concretized at a level where the system is able to be deployed has been obtained.

5. The system design learning device according to claim 3, wherein a fact that the system design has failed includes a fact that it is determined that a system requirement concretized at a level where the system is able to be deployed has not been obtained.

6. The system design learning device according to claim 1, wherein the at least one processor is configured to execute the instructions to determine, when the design result indicates that the system design has succeeded, the evaluation value for the system design on the basis of an obtained system evaluation index value.

7. The system design learning device according to claim 1, wherein the at least one processor is configured to execute the instructions to generate, for each conversion rule capable of being used in the system design, concretized component information indicating a component to be concretized by the conversion rule, and the at least one processor is configured to execute the instructions to determine the conversion rule for use in the system design based on the concretized component information.

8. The system design learning device according to claim 7, wherein the at least one processor is configured to execute the instructions to perform learning of a component evaluation model that, in response to an input of a system requirement, outputs an evaluation of each component shown in the system requirement, and the at least one processor is configured to execute the instructions to select the component to which the conversion rule is applied based on the evaluation of the component evaluation model for each component shown in the system requirement, select one conversion rule among a conversion rule candidate which is the conversion rule indicated as being applicable to the selected component in the concretized component information, and apply the selected conversion rule to the selected component.

9. The system design learning device according to claim 8, wherein the at least one processor is configured to execute the instructions to select the one conversion rule among the conversion rule candidate based on an evaluation of the component evaluation model for a system requirement after application of the conversion rule of each conversion rule candidate that is obtained by applying the conversion rule candidate to the system requirement.

10. A system design learning method comprising:

performing, with respect to a design target system whose system requirement is shown, system design in which application of a conversion rule to a component of the design target system is iterated until a design result of the system design is obtained;

determining an evaluation value for the system design based on the design result;

determining an evaluation value related to conversion of each component in the system design based on the evaluation value for the system design; and learning about selection of a component to which the conversion rule is applied based on learning data including the evaluation value related to the conversion of each component, wherein the learning comprises performing learning of a component evaluation model using the learning data, the component evaluation model being a model that, in response to an input of the system requirement, outputs an evaluation value of each component shown in the system requirement, and wherein the performing learning of the component evaluation model comprises updating a parameter value of the component evaluation model so that an evaluation value output by the component evaluation model is close to the evaluation value included in the learning data.

11. A non-transitory computer-readable recording medium that stores a program for causing a computer to:

perform, with respect to a design target system whose system requirement is shown, system design in which application of a conversion rule to a component of the design target system is iterated until a design result of the system design is obtained;

determine an evaluation value for the system design based on the design result;

determine an evaluation value related to conversion of each component in the system design based on the evaluation value for the system design; and perform learning about selection of a component to which the conversion rule is applied based on learning data including the evaluation value related to the conversion of each component, wherein the learning comprises performing learning of a component evaluation model using the learning data, the component evaluation model being a model that, in response to an input of the system requirement, outputs an evaluation value of each component shown in the system requirement, and wherein the performing learning of the component evaluation model comprises updating a parameter value of the component evaluation model so that an evaluation value output by the component evaluation model is close to the evaluation value included in the learning data.

* * * * *